(12) United States Patent
Tang

(10) Patent No.: US 12,324,407 B1
(45) Date of Patent: Jun. 10, 2025

(54) PET TOILET

(71) Applicant: PETPIVOT INC, Portland, OR (US)

(72) Inventor: Xiaoxiang Tang, Guangdong (CN)

(73) Assignee: PETPIVOT INC, Portland, OR (US)

( * ) Notice: Subject to any disclaimer, the term of this patent is extended or adjusted under 35 U.S.C. 154(b) by 23 days.

(21) Appl. No.: 18/541,416

(22) Filed: Dec. 15, 2023

(30) Foreign Application Priority Data

Nov. 24, 2023 (CN) .......................... 202311594175.5

(51) Int. Cl.
*A01K 1/01* (2006.01)
(52) U.S. Cl.
CPC .................................. *A01K 1/0114* (2013.01)
(58) Field of Classification Search
CPC .... A01K 1/0114; A01K 1/011; A01K 1/0107; B07B 1/28; B07B 1/42
See application file for complete search history.

(56) References Cited

U.S. PATENT DOCUMENTS

| | | | |
|---|---|---|---|
| 5,662,066 A * | 9/1997 | Reitz .................... | A01K 1/0114 119/163 |
| 11,457,604 B1 * | 10/2022 | Fan ....................... | A01K 1/0114 |
| 11,944,066 B2 * | 4/2024 | Ma .......................... | B07B 1/28 |
| 11,963,512 B1 * | 4/2024 | Tang ..................... | A01K 1/0114 |
| 12,075,750 B2 * | 9/2024 | Zhou ..................... | A01K 1/0114 |
| 12,171,188 B2 * | 12/2024 | Tian ...................... | A01K 1/0114 |
| 12,225,877 B1 * | 2/2025 | Lin ........................ | A01K 1/0114 |
| 2008/0017123 A1 * | 1/2008 | Chin ....................... | A01K 1/011 119/166 |
| 2021/0267158 A1 * | 9/2021 | Ma .......................... | A01K 1/011 |

* cited by examiner

*Primary Examiner* — Yvonne R Abbott-Lewis

(57) ABSTRACT

The present disclosure provides a pet toilet that achieves automatic cleaning of excrement of a pet. When a drum rotates on a base, if a pet is located in a first safety space between the base and the drum, the pet can escape through a first safety notch, which can effectively prevent the pet from being pinched by the base and the rotating drum and significantly improve the safety of the smart pet toilet.

20 Claims, 29 Drawing Sheets

PET TOILET

CROSS-REFERENCE TO RELATED APPLICATIONS

The application claims priority of Chinese patent application CN2023115941755, filed on Nov. 24, 2023, which is incorporated herein by reference in its entireties.

TECHNICAL FIELD

The present disclosure relates to the field of pet toilets, and in particular, to a pet toilet.

BACKGROUND

Most current pet toilets are ordinary containers, such as a pet litter box. There is litter in the pet litter box for pets to use for defecation. However, a major issue with these toilets is that after a pet defecates, a pet owner has to personally clean up excrement. This process is time-consuming and laborious, and the odor of the excrement also poses a significant challenge for the pet owner. Therefore, there is an urgent need in the market for an intelligent pet litter box that can automatically clean up the excrement, thereby improving the user experience.

SUMMARY

In order to overcome the shortcomings of the prior art, the present disclosure provides a pet toilet, including:
- a drum, wherein the drum is provided with a first opening and a first accommodating space; the first opening is in communication with the first accommodating space, and the first accommodating space is configured to accommodate excrement of a pet and pet litter;
- a base, wherein the base is configured to support the drum; the base includes a left side wall, a right side wall, and a connecting wall that connects the left side wall to the right side wall; a first support arm is arranged on the left side wall, and a second support arm is arranged on the right side wall; the left side wall has a first end and a second end, and the right side wall has a third end and a fourth end; a first safety notch is formed between the first end of the left side wall and the third end of the right side wall, so as to form an open first safety space between the base and the drum;
- an excrement collection box, wherein the excrement collection box is arranged below the base, and the excrement collection box has a second accommodating space and a second opening; the second opening is in communication with the second accommodating space;
- a sieve component, wherein the sieve component is connected to the drum; the sieve component and an inner wall of the drum are enclosed to form a third accommodating space; the third accommodating space is adjacent to the first accommodating space; the sieve component is configured to separate the pet litter from the excrement; and
- a drive device, wherein the drive device is configured to drive the drum to rotate on the base; when the first opening rotates with the drum from an initial position to a defecation position, the pet litter enters the third accommodating space through the sieve component, and the excrement is stopped outside the third accommodating space; the first opening is aligned with the second opening as the drum rotates, so that the excrement falls into the second accommodating space by an own gravity via the first opening and the second opening; and when the first opening rotates with the drum from the defecation position to the initial position, the pet litter in the third accommodating space passes through the sieve component and falls back into the first accommodating space by the own gravity.

As the improvement of the present disclosure, the second end of the left side wall is connected to the fourth end of the right side wall through the connecting wall.

As the improvement of the present disclosure, the excrement collection box includes an accommodating box body and a filling protrusion; the filling protrusion is connected to the accommodating box body and is configured to fill a space between the connecting wall and the accommodating box body.

As the improvement of the present disclosure, a second safety notch is formed between the second end of the left side wall and the fourth end of the right side wall, so as to form an open second safety space between the base and the drum.

As the improvement of the present disclosure, a middle part of the left side wall is connected to a middle part of the right side wall through the connecting wall.

As the improvement of the present disclosure, the drive device includes a drive component; the drive component includes a drive motor, a driving gear, and a driven gear; the drive motor has a drive shaft; the driving gear sleeves the drive shaft; the driven gear is arranged on the drum; the driven gear is engaged with the driving gear, so that the rotation of the drive shaft drives the driving gear to rotate, and the rotation of the driving gear drives the driven gear to rotate; and the rotation of the driven gear drives the drum to rotate on the base.

As the improvement of the present disclosure, one side of the base is provided with a first support arm, and the other side of the base is provided with a second support arm; the first support arm and the second support arm are provided with support grooves; each of two sides of the drum has a support shaft; the support shafts are located in the support grooves; several first rollers are arranged in the support grooves; and the first rollers support the support shafts.

As the improvement of the present disclosure, the base is further provided with a recess that is indented in a direction facing away from the drum; when the drum is supported on the base, a space exists between the drum and an inner wall of the recess; and the recess is provided with second rollers.

As the improvement of the present disclosure, a mounting groove is also arranged below the support grooves; the mounting groove is in communication with the support grooves; the driving gear is arranged inside the mounting groove; a fourth opening is arranged on an inner wall of the mounting groove; and the mounting groove is in communication with the outside through the fourth opening.

As the improvement of the present disclosure, the first support arm is located between the first end and the third end, and the second support arm is located between the second end and the fourth end.

As the improvement of the present disclosure, the excrement collection box has a first outer side wall and a first bottom wall; the first bottom wall is connected to the first outer side wall; a distance between one side of the first bottom wall and a bottom end of the first outer side wall is a first distance; a distance between the other side of the first bottom wall and the bottom end of the first outer side wall is a second distance; and the first distance is different from the second distance, so that the first bottom wall is arranged in an inclined angle.

As the improvement of the present disclosure, a locking device is arranged on the base; the locking device is configured to detachably lock the excrement collection box below the base.

As the improvement of the present disclosure, the locking device is a locking snap.

As the improvement of the present disclosure, n several raised frameworks are arranged within the first accommodating space.

As the improvement of the present disclosure, the pet toilet further includes a mat; and the mat is detachably covered at the frameworks and a bottom surface of the first accommodating space.

As the improvement of the present disclosure, the mat is in buckled connection to the inner wall of the drum.

As the improvement of the present disclosure, the mat is provided with a buckle part, and the inner wall of the drum is provided with a buckle fitting part, so that the buckle part and the buckle fitting part are detachably connected.

As the improvement of the present disclosure, a raised annular leak-proof ring is arranged in the first accommodating space; and the annular leak-proof ring is configured to stop the excrement of the pet in the first accommodating space.

As the improvement of the present disclosure, the pet toilet further includes support legs, wherein the support legs are connected to the base to support the base, and a fourth accommodating space is formed between bottom ends of the support legs and the base and the excrement collection box is arranged inside the fourth accommodating space.

As the improvement of the present disclosure, the support legs are detachably connected to the base.

Beneficial effects of the present disclosure are as follows: The present disclosure provides a pet toilet. Through the above structure, when the drum rotates on the base, if a pet is in the first safety space between the base and the drum, the pet can escape through the first safety notch. This prevents the pet from being pinched by the base and the rotating drum.

BRIEF DESCRIPTION OF THE DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE EMBODIMENTS

Figure 1:
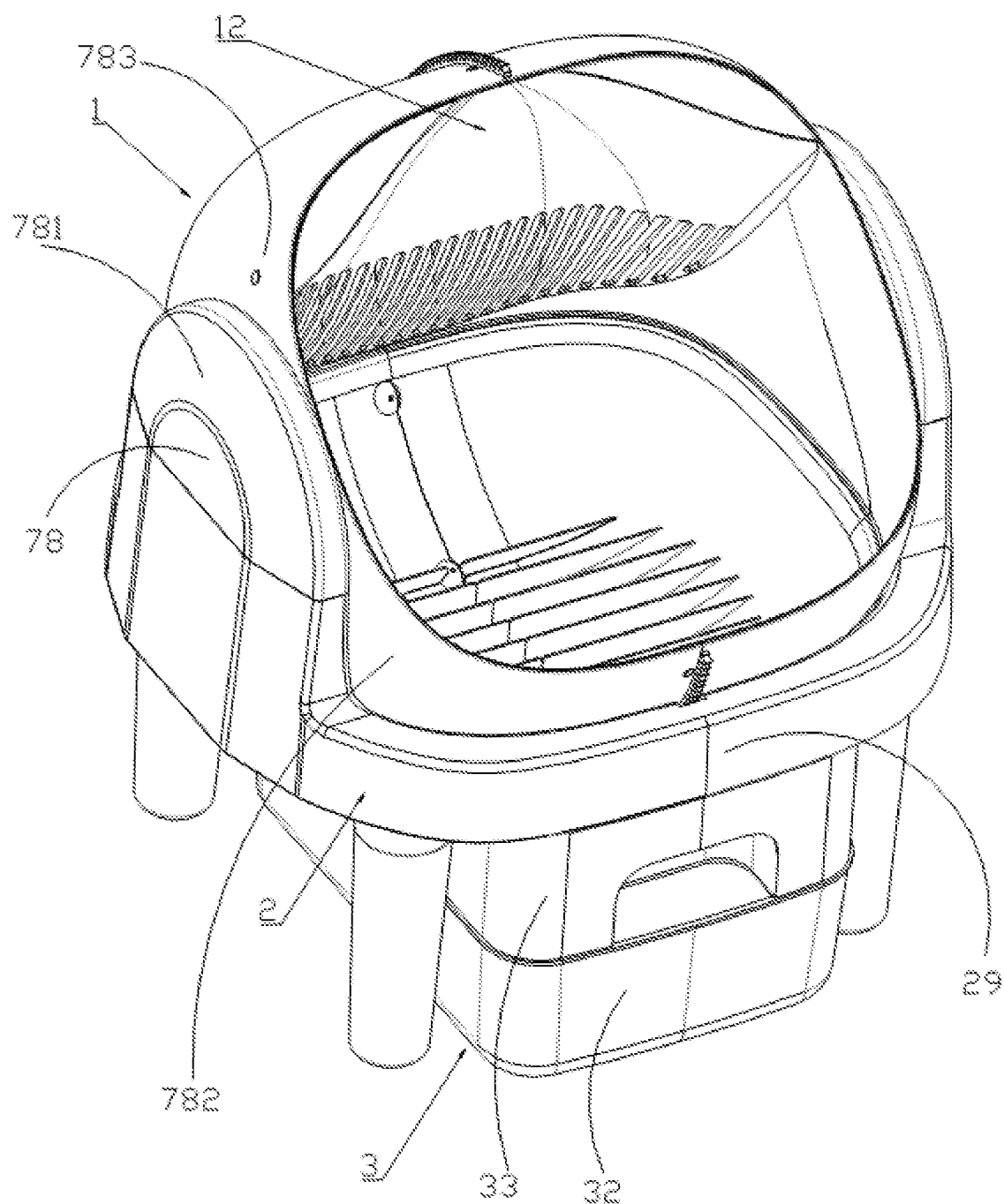
FIG. 1 is a schematic diagram of an overall structure when a drum of the present disclosure is in an initial position.
Figure 2:
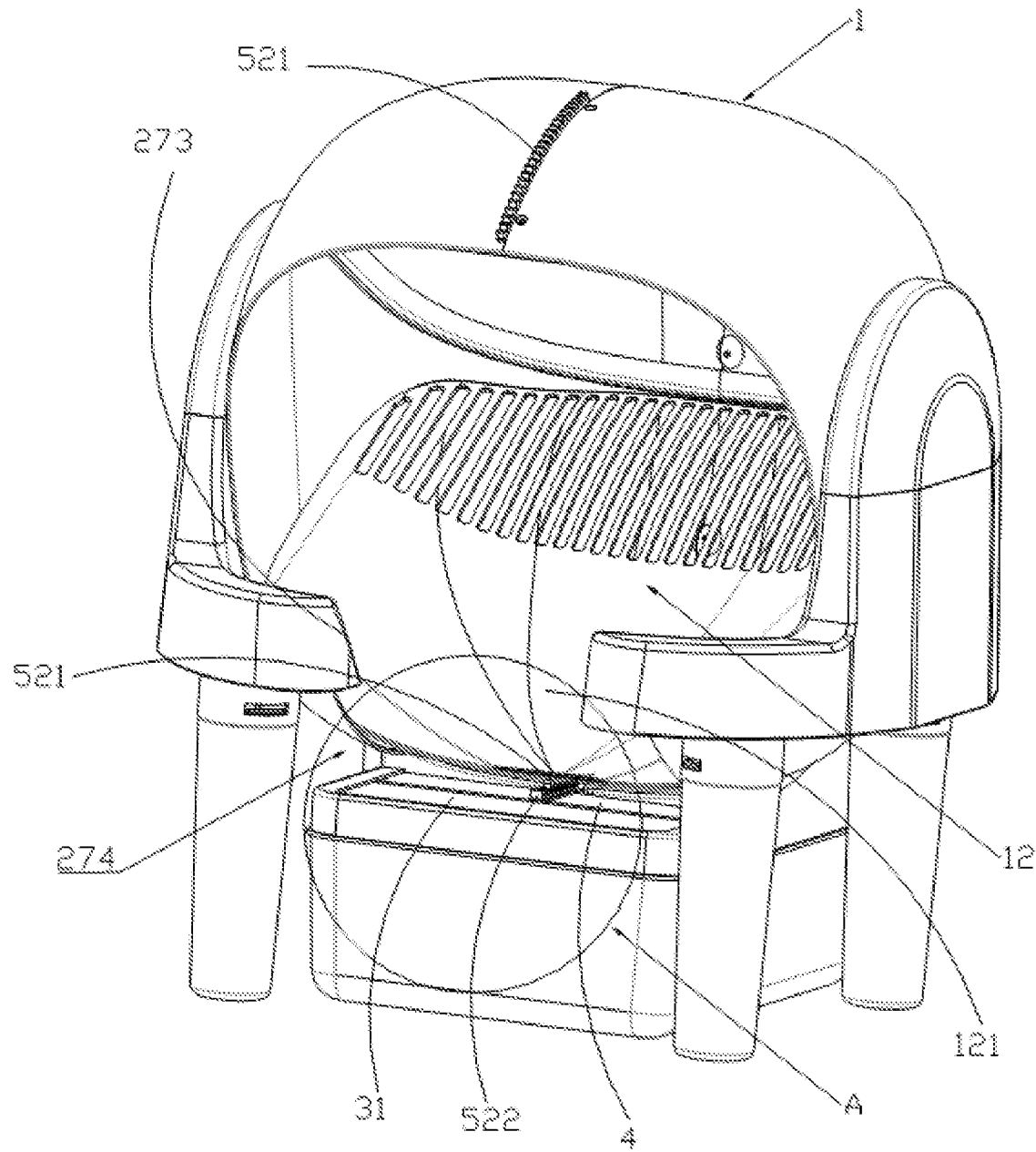
FIG. 2 is a schematic diagram of an overall structure when a drum of the present disclosure is in a defecation position.
Figure 3:
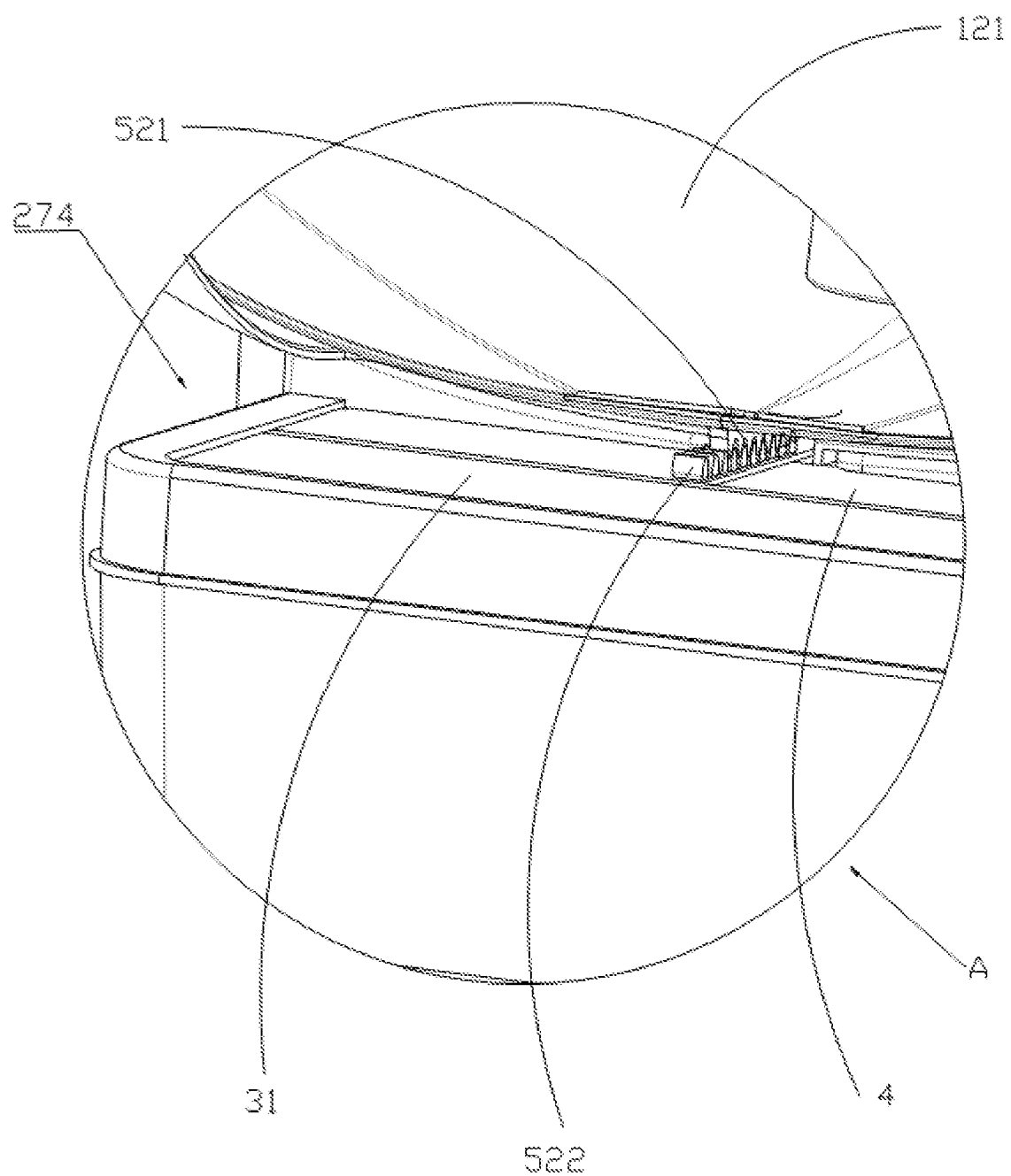
FIG. 3 is an enlarged view of part A in FIG. 2.
Figure 4:
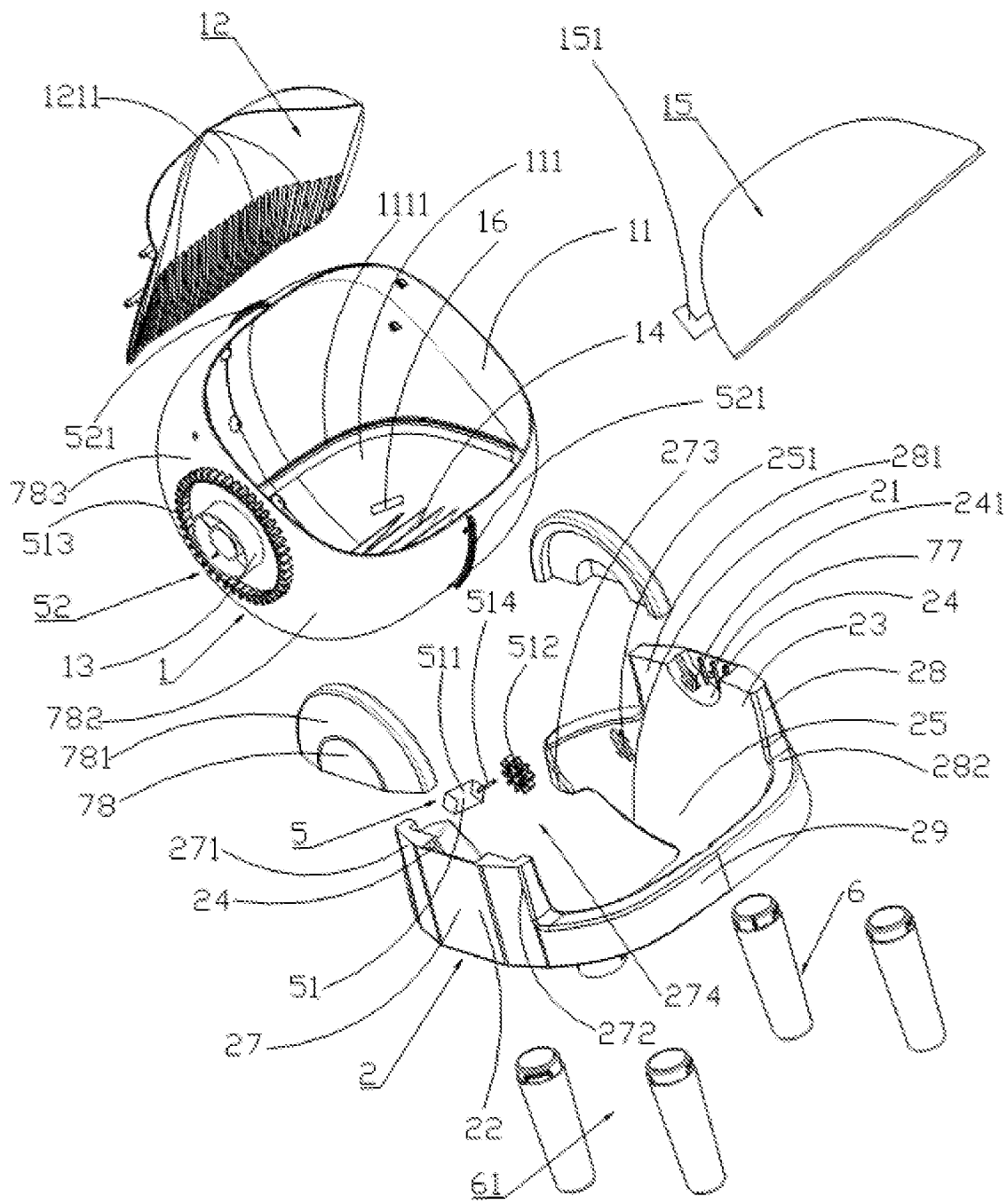
FIG. 4 is an exploded view of a drum and a base.
Figure 5:
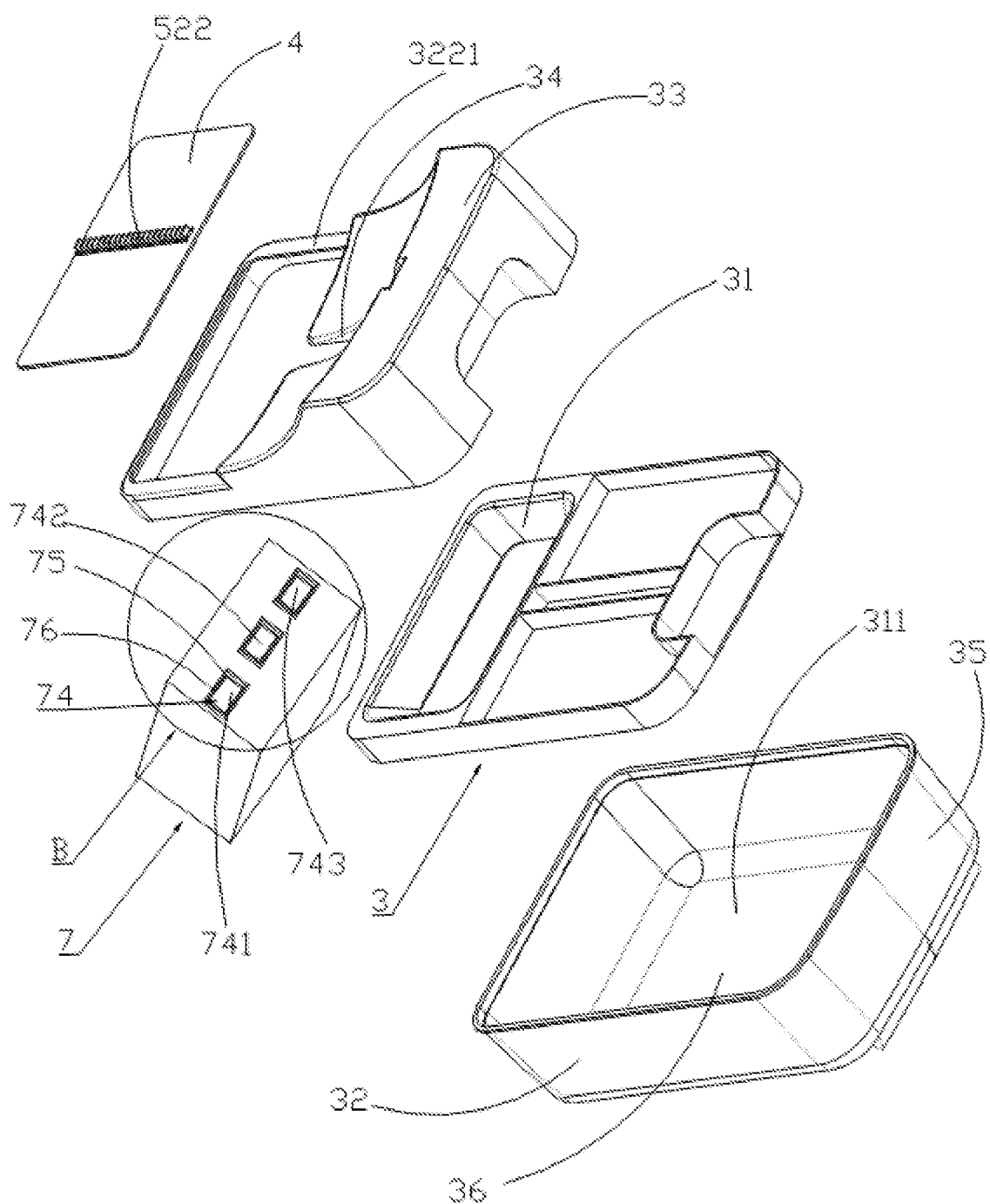
FIG. 5 is an exploded view of the excrement collection box.
Figure 6:
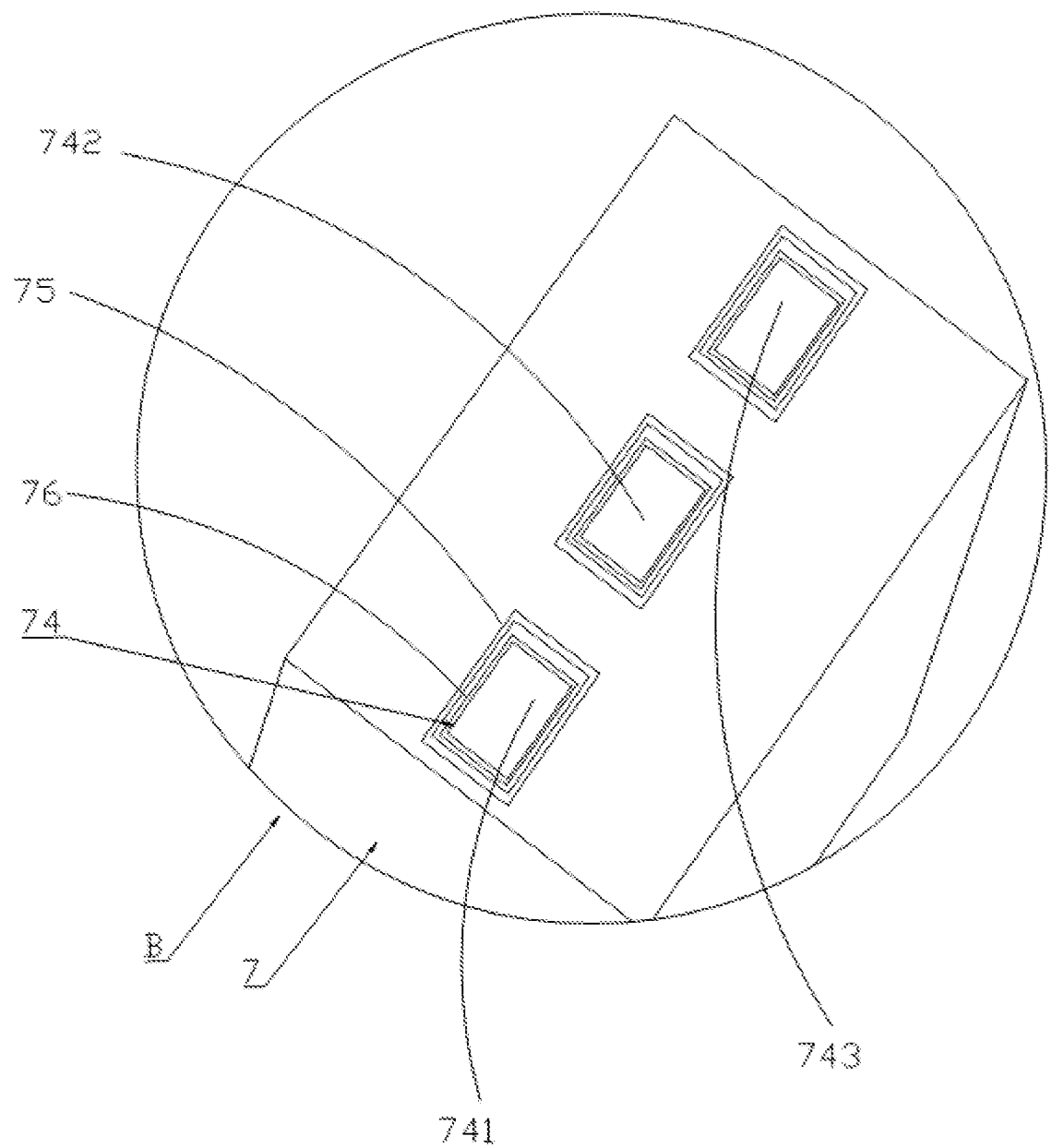
FIG. 6 is an enlarged view of part B in FIG. 5.
Figure 7:
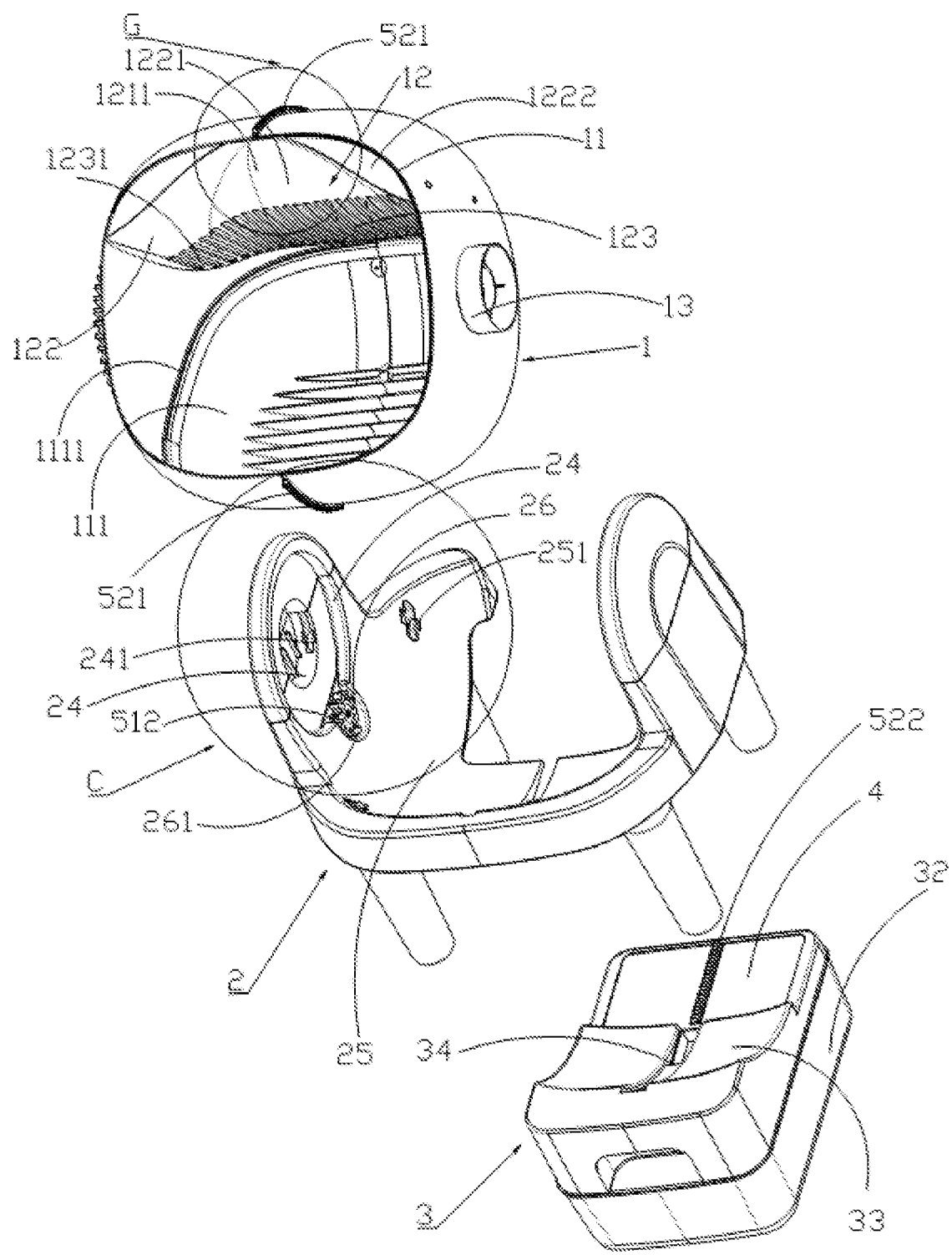
FIG. 7 is a schematic diagram of an overall structure of the present disclosure.
Figure 8:
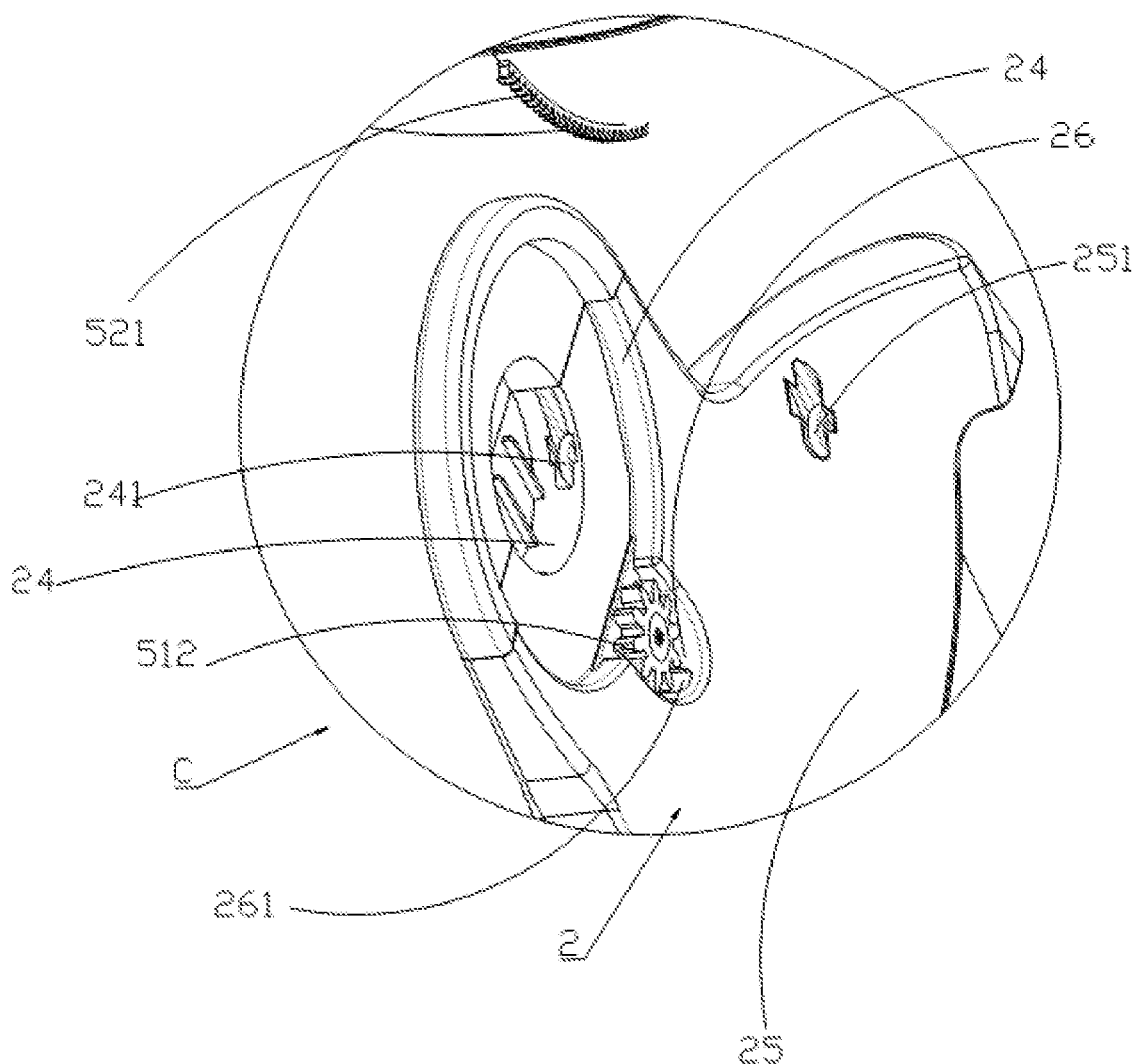
FIG. 8 is an enlarged view of part C in FIG. 7.
Figure 9:
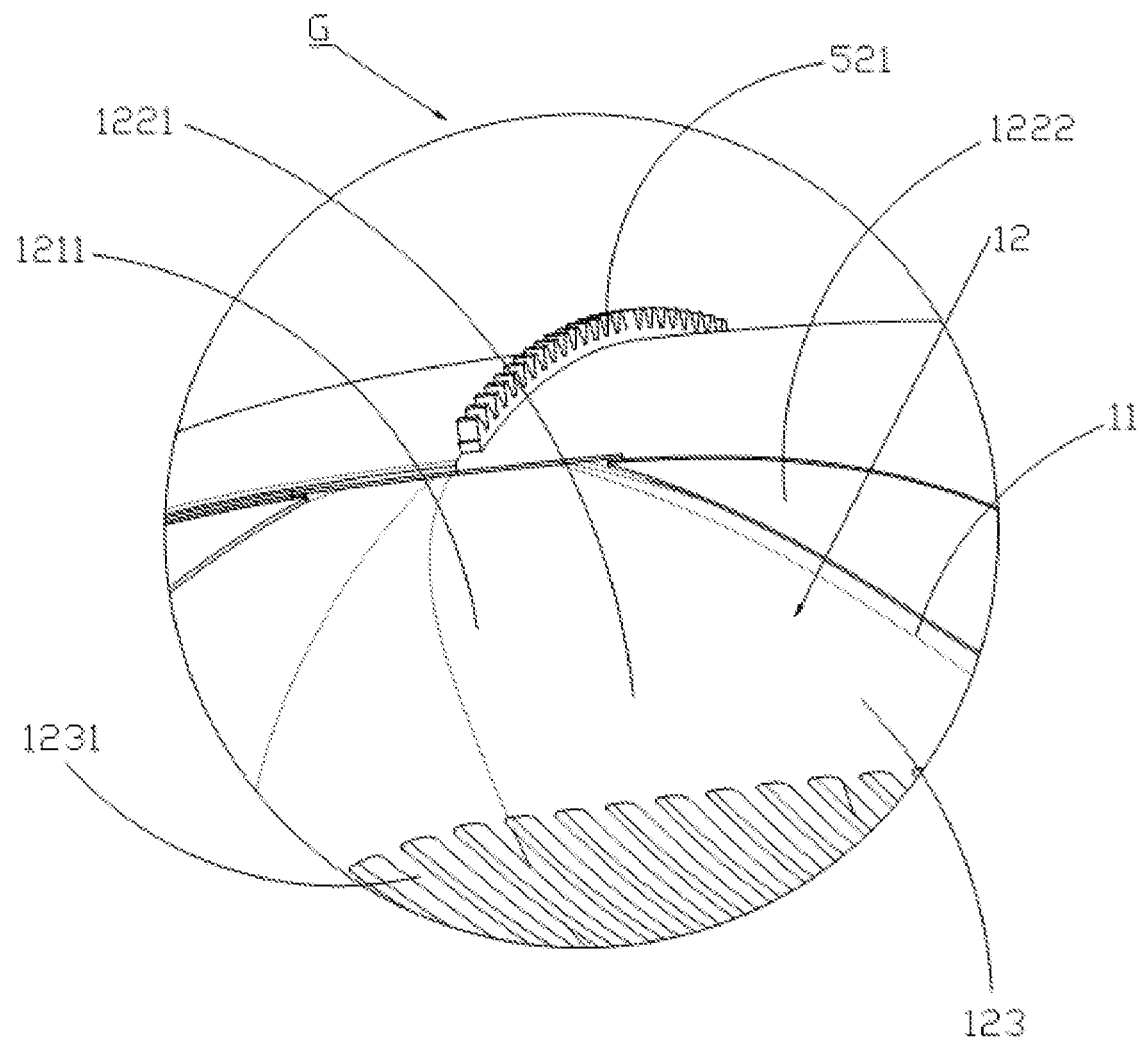
FIG. 9 is an enlarged view of part G in FIG. 7.
Figure 10:
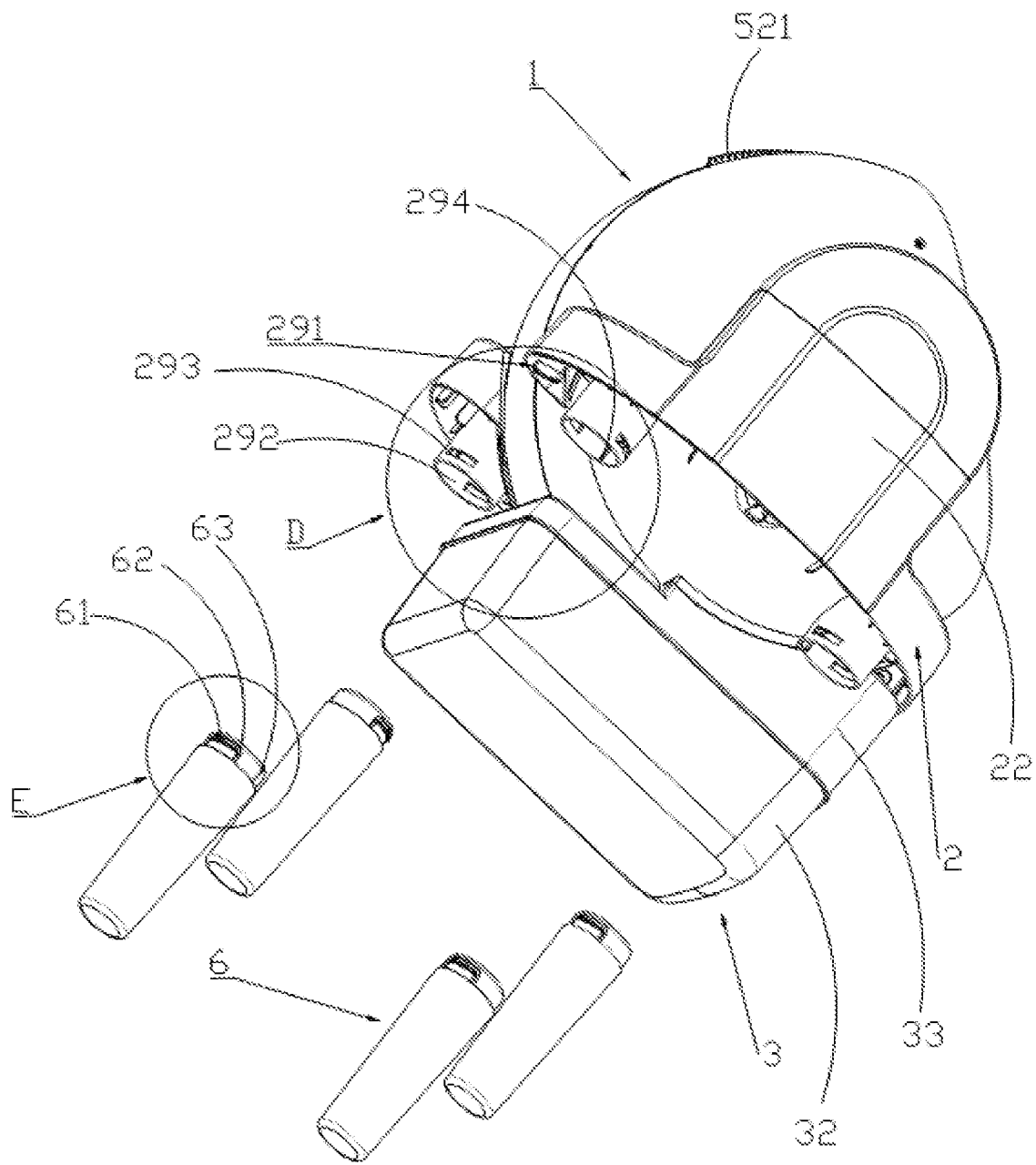
FIG. 10 is a schematic diagram of another overall structure of the present disclosure.
Figure 11:
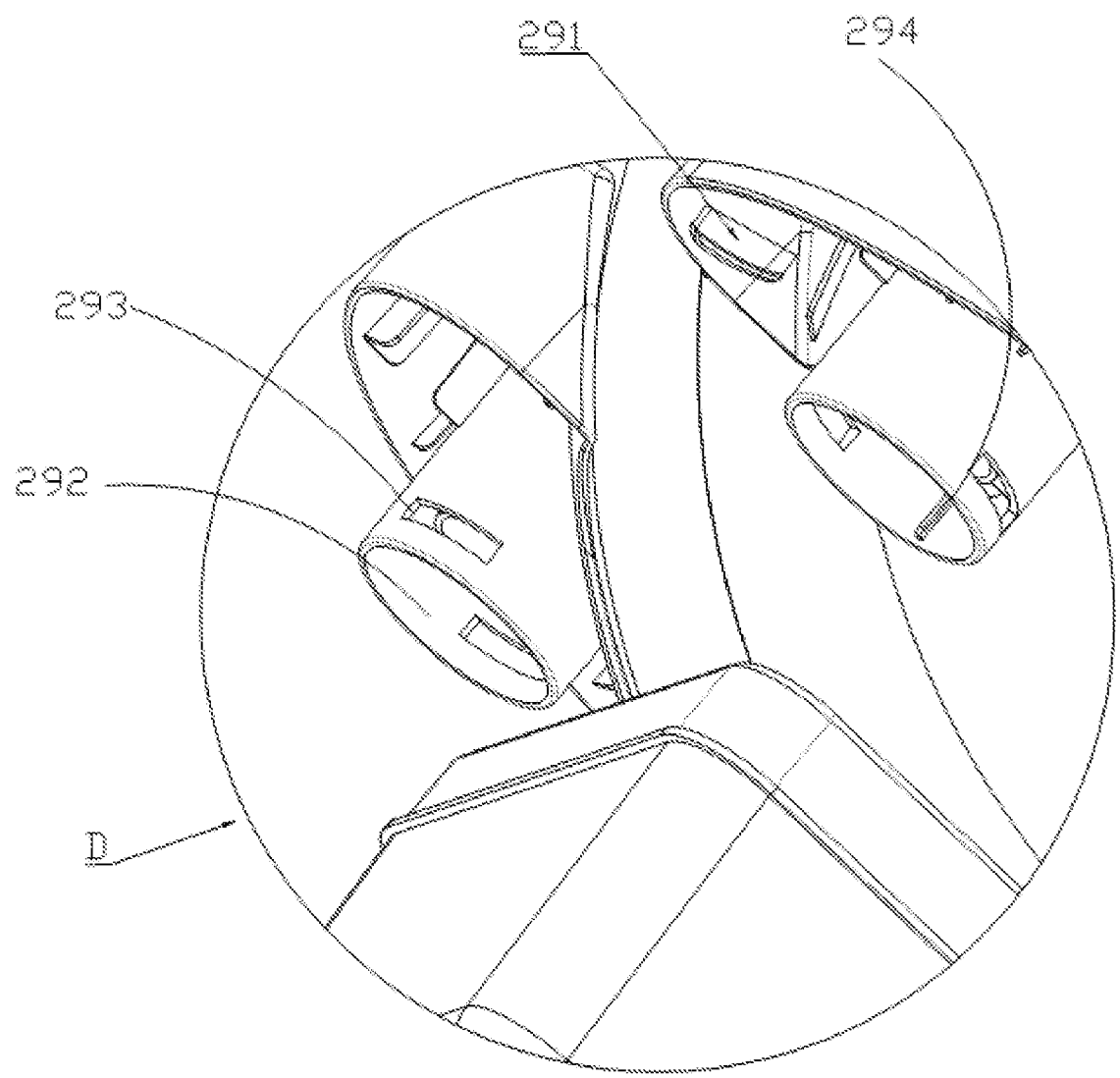
FIG. 11 is an enlarged view of part D in FIG. 10.
Figure 12:
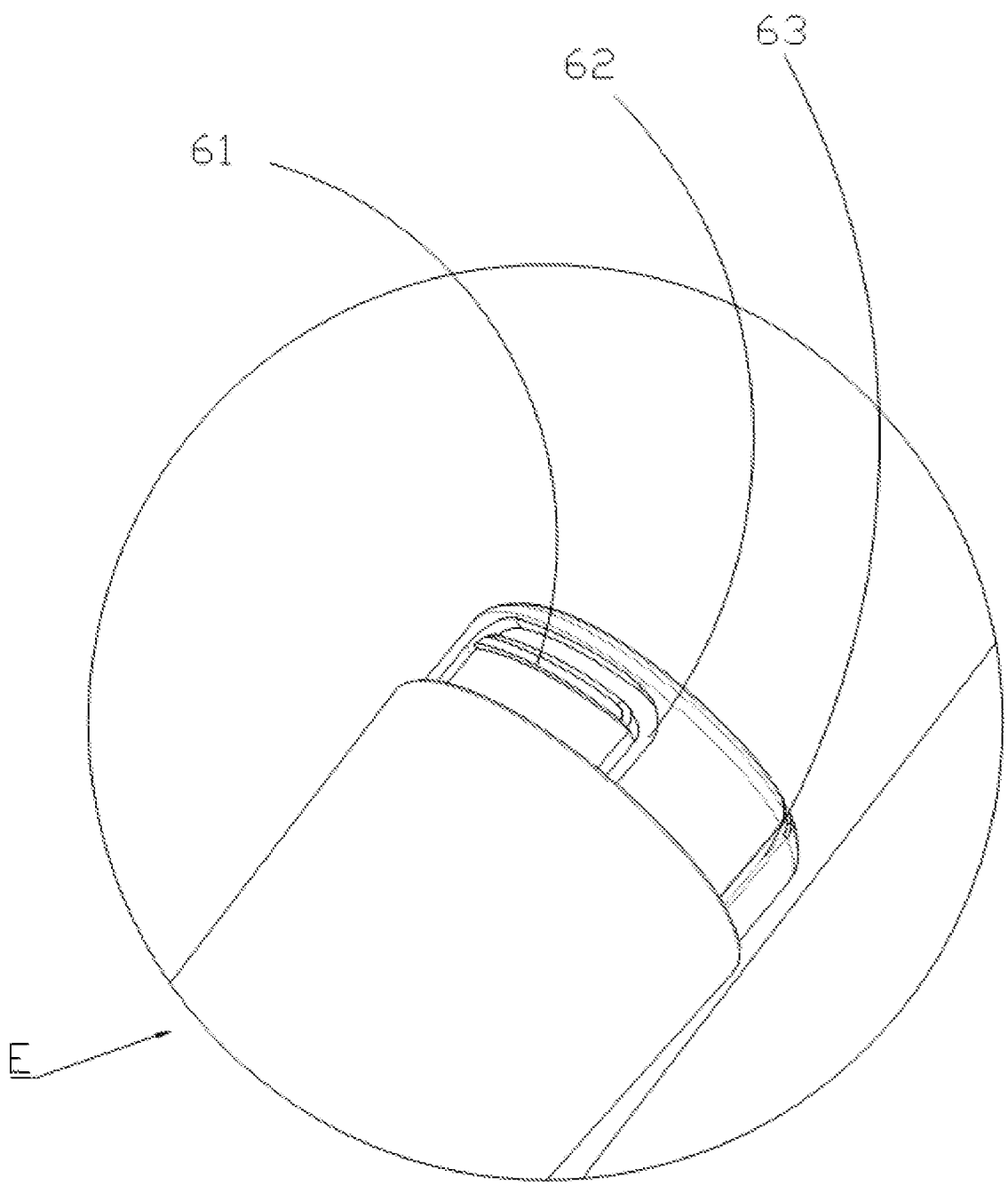
FIG. 12 is an enlarged view of part E in FIG. 10.
Figure 13:
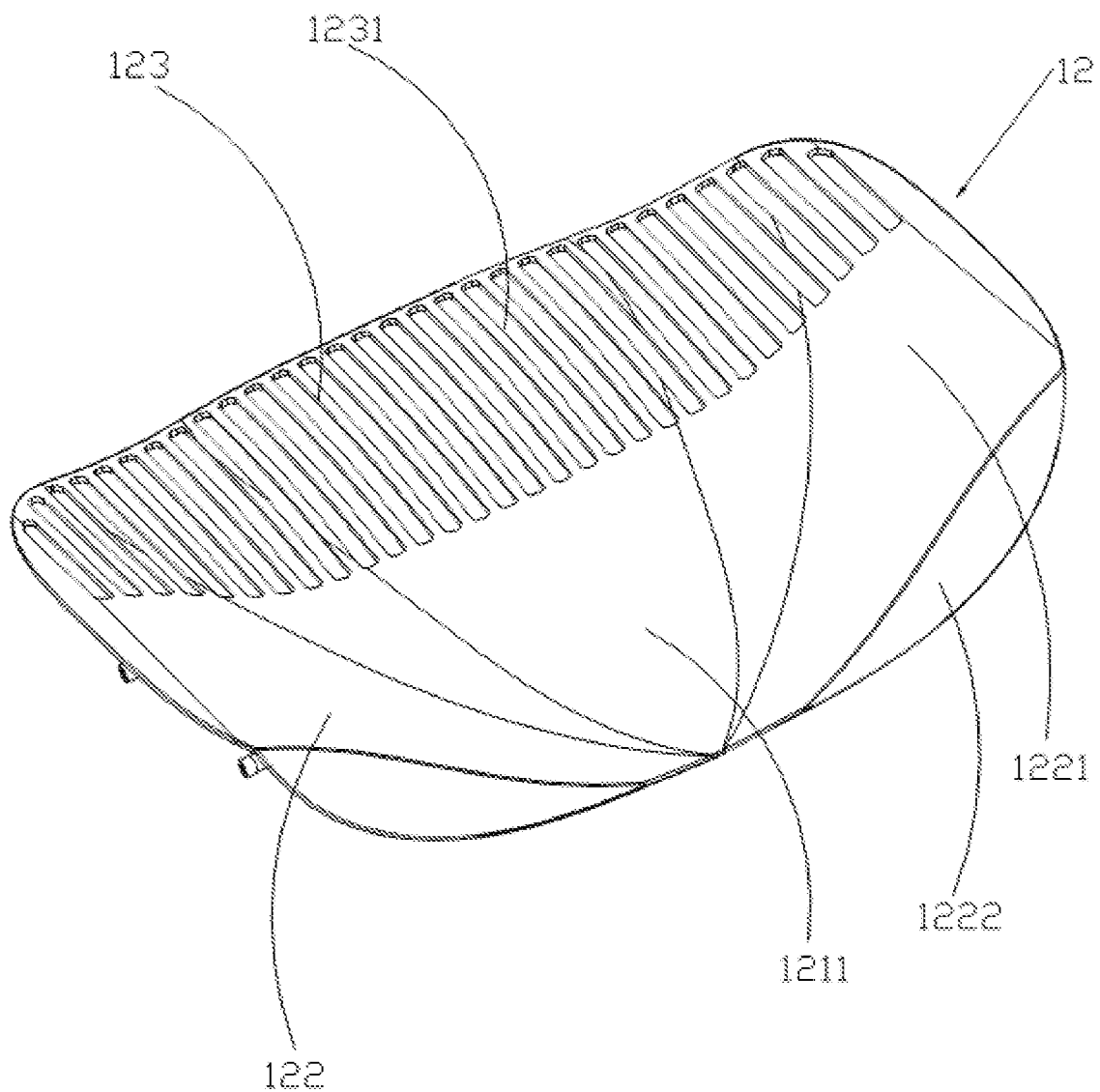
FIG. 13 is a schematic diagram of a structure of a sieve component.
Figure 14:
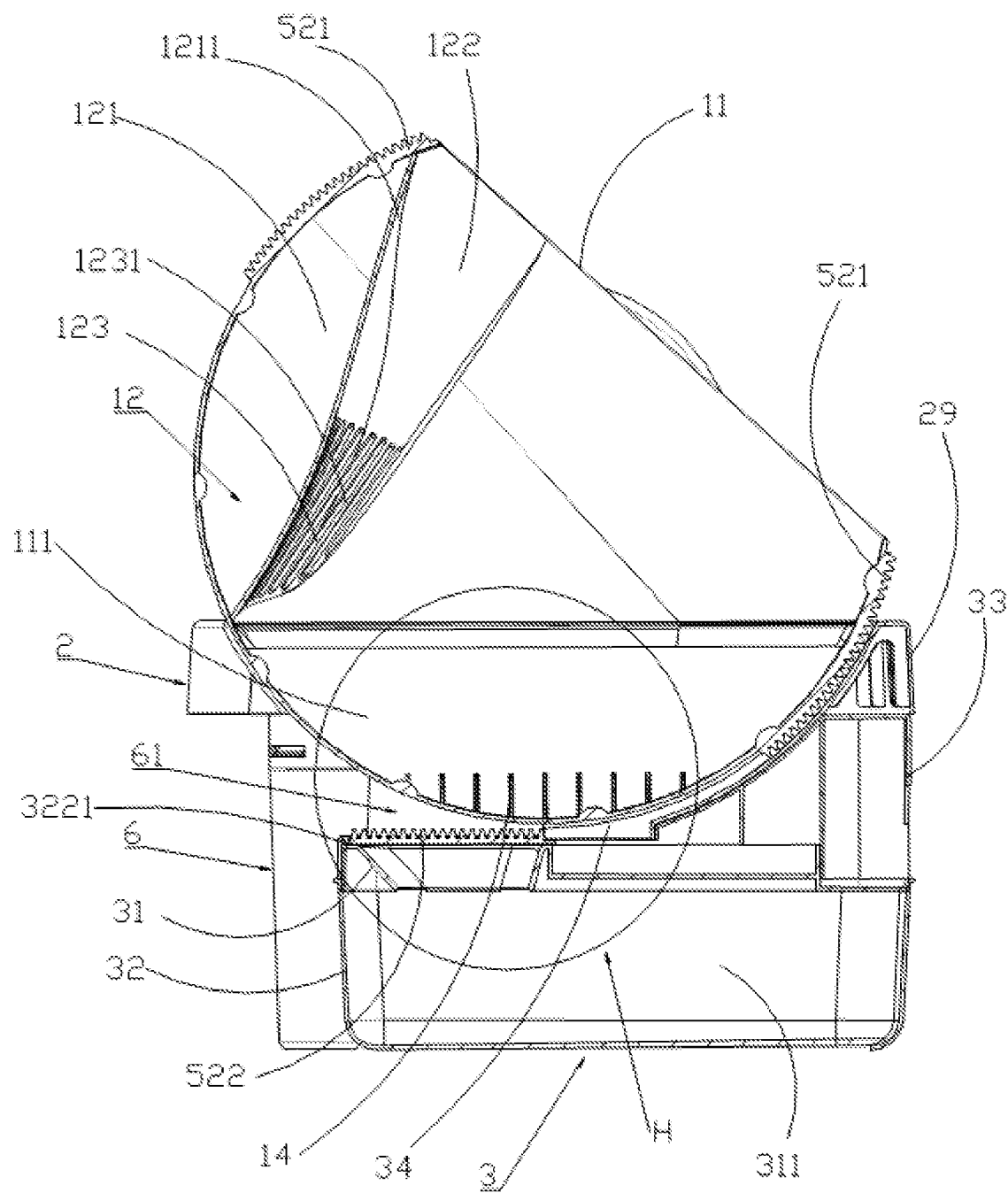
FIG. 14 is a sectional view along a drum, a base, and an excrement collection box when the drum is in an initial position.
Figure 15:
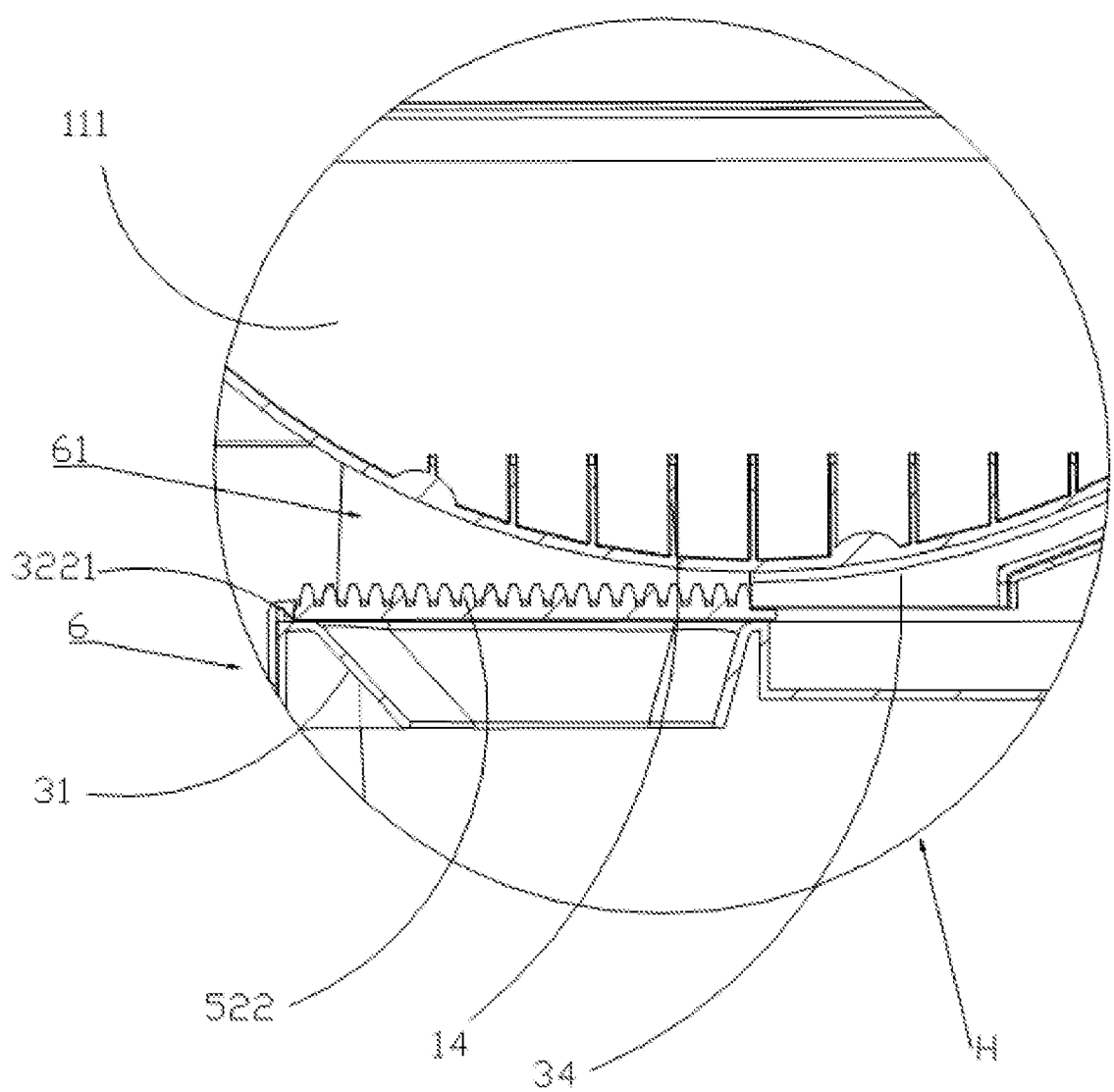
FIG. 15 is an enlarged view of part H in FIG. 14.
Figure 16:
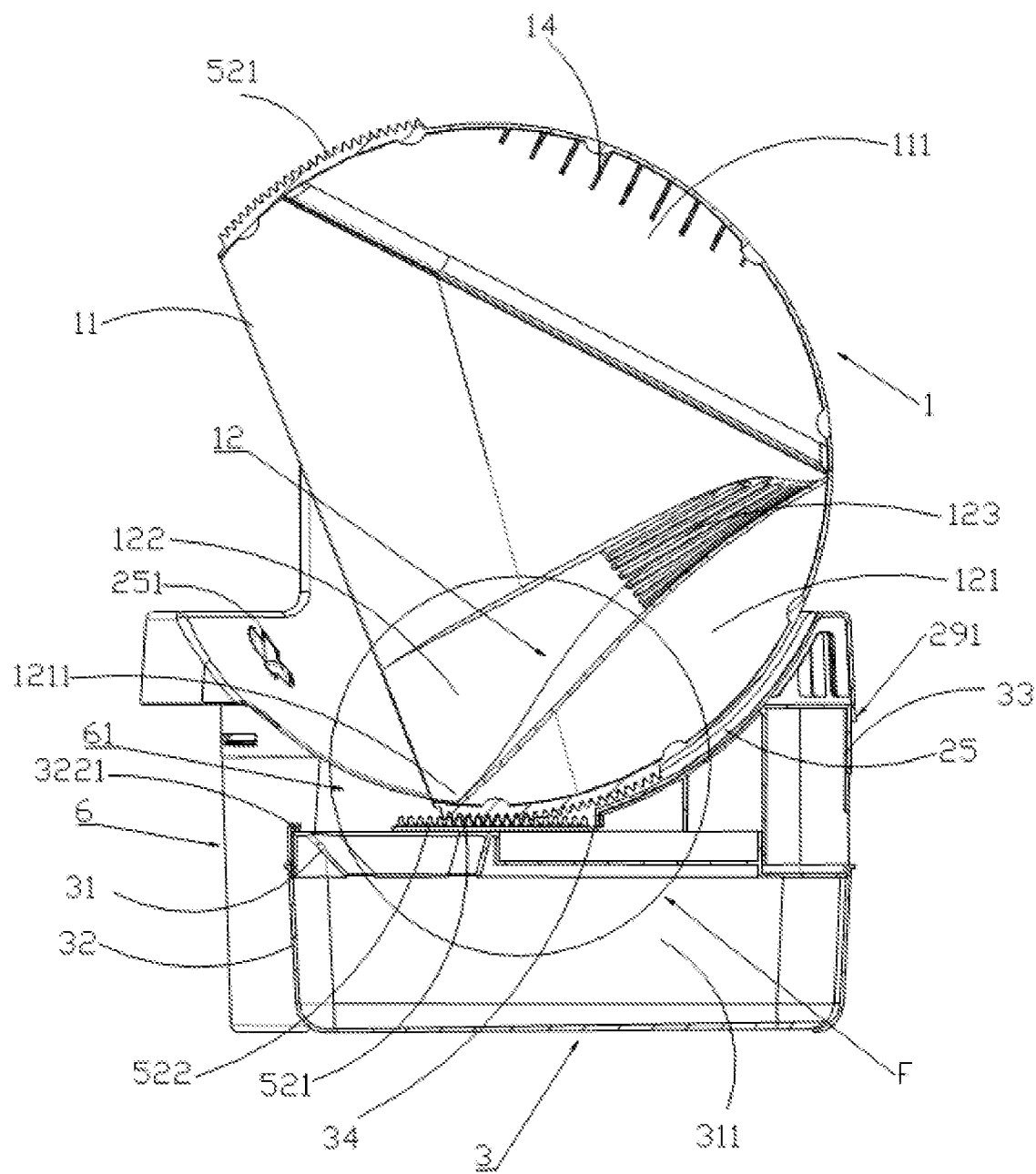
FIG. 16 is a sectional view along a drum, a base, and an excrement collection box when the drum is in a defecation position.
Figure 17:
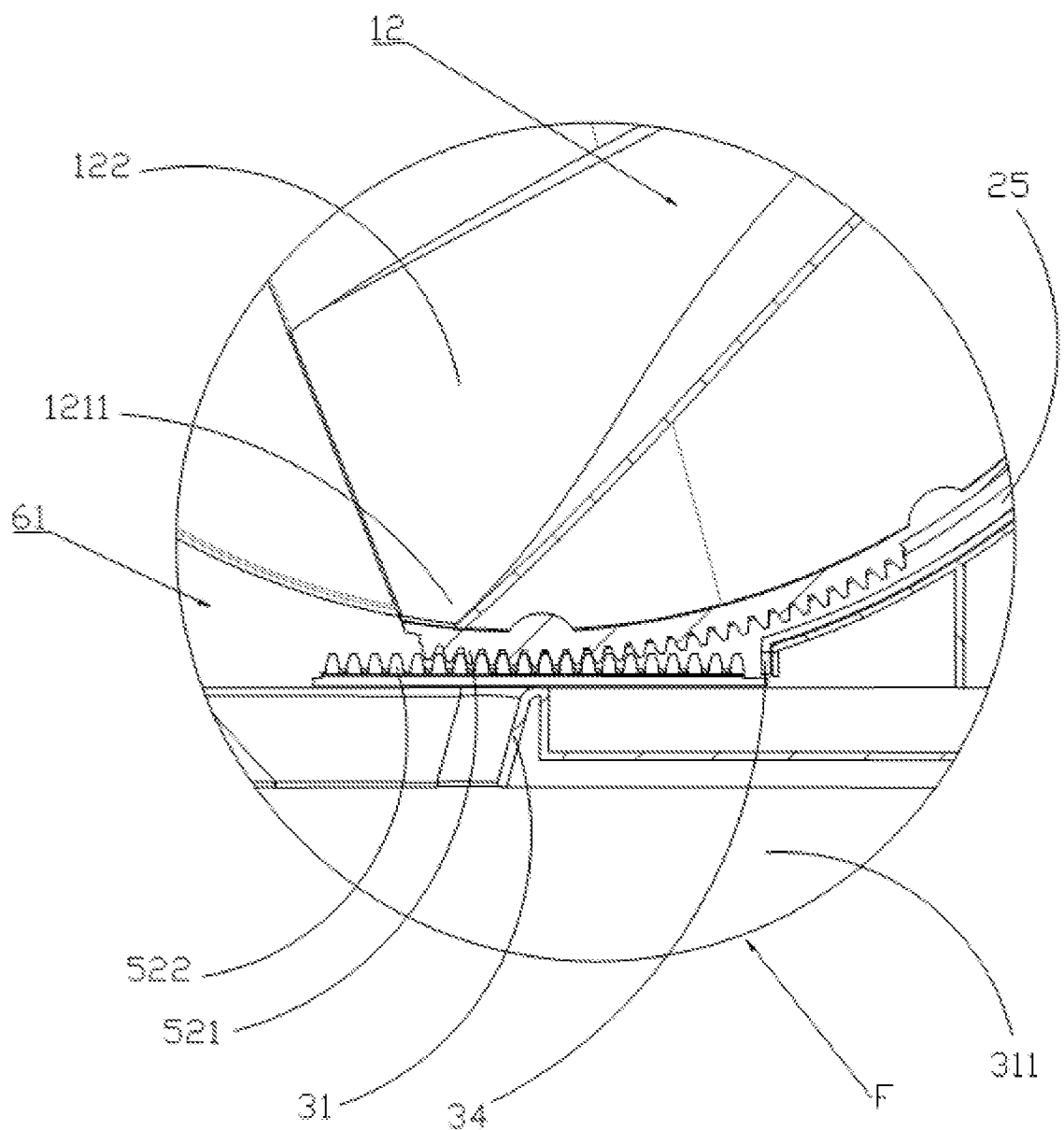
FIG. 17 is an enlarged view of section F of FIG. 16.
Figure 18:
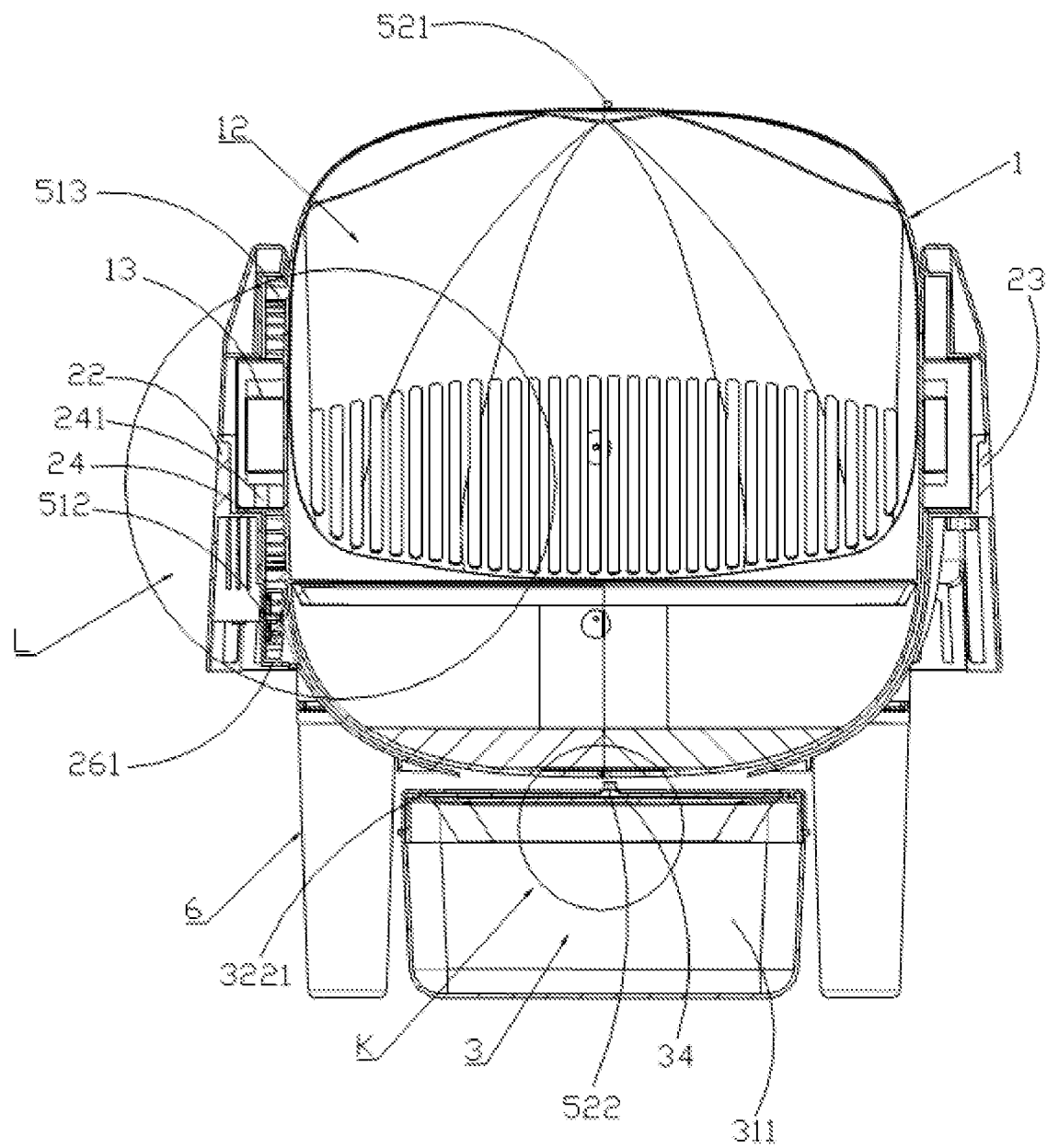
FIG. 18 is a sectional view along a sealing door and a support arm.
Figure 19:
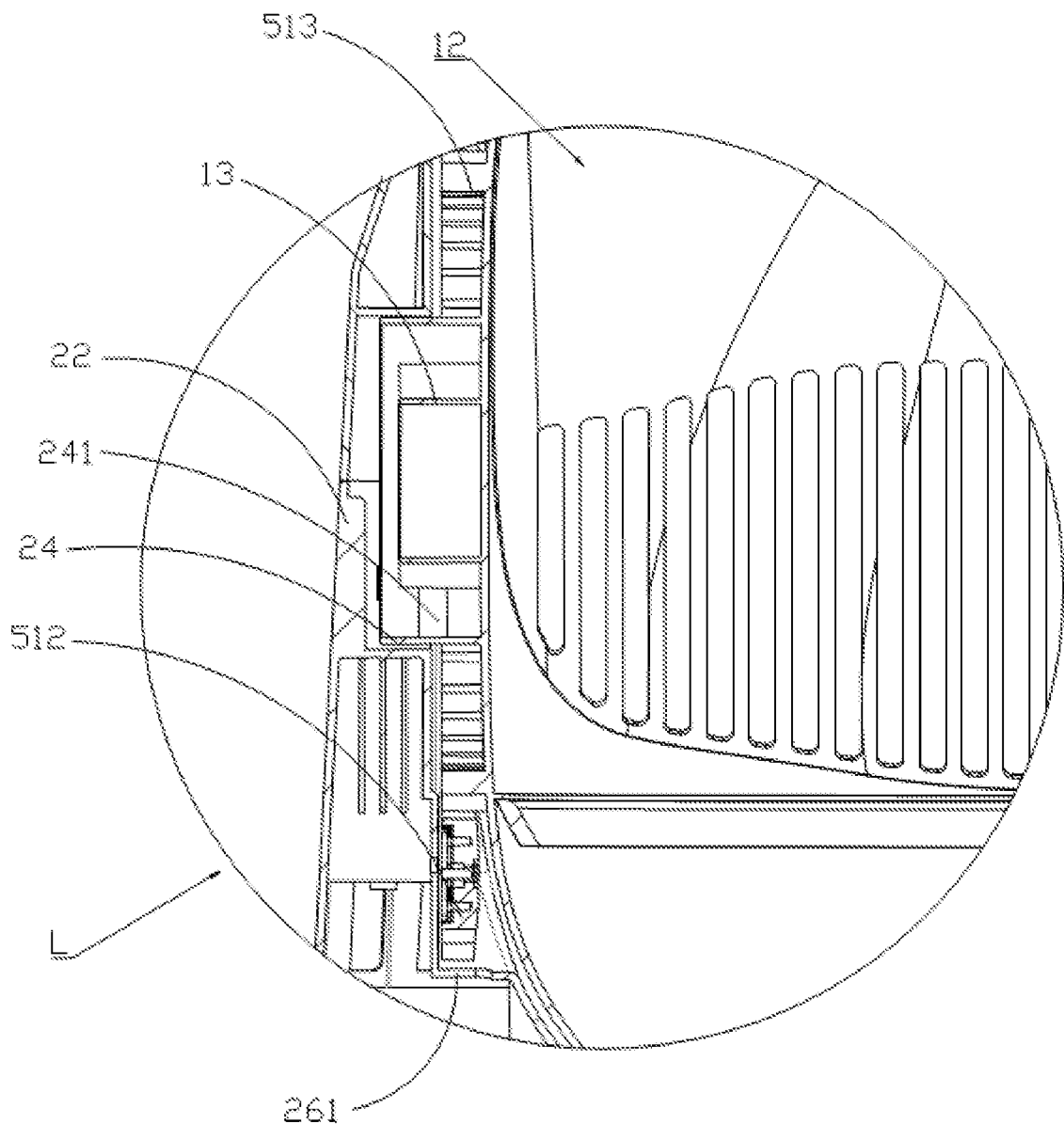
FIG. 19 is an enlarged view of part L of FIG. 18.
Figure 20:
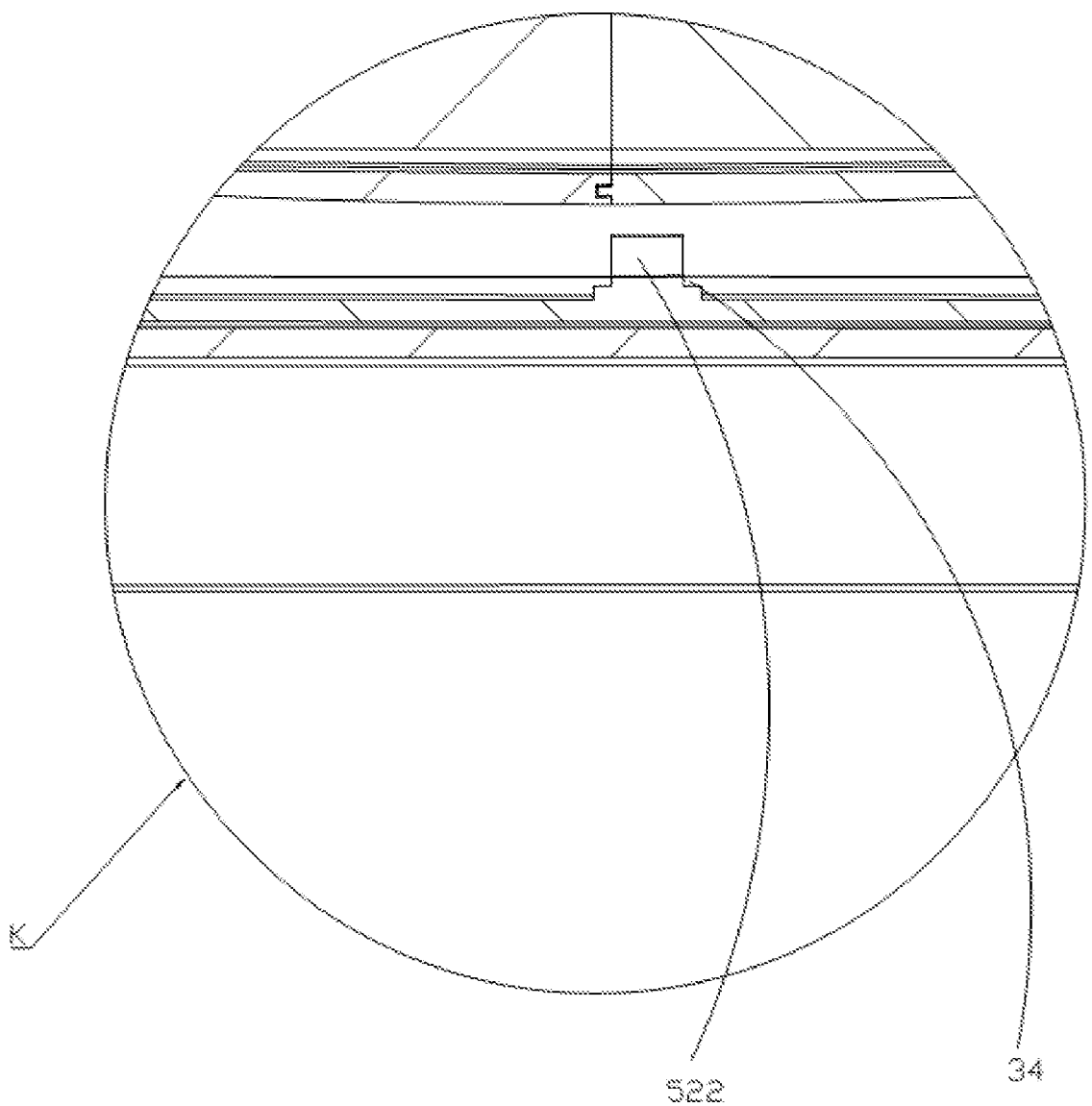
FIG. 20 is an enlarged view of part K of FIG. 18.
Figure 21:
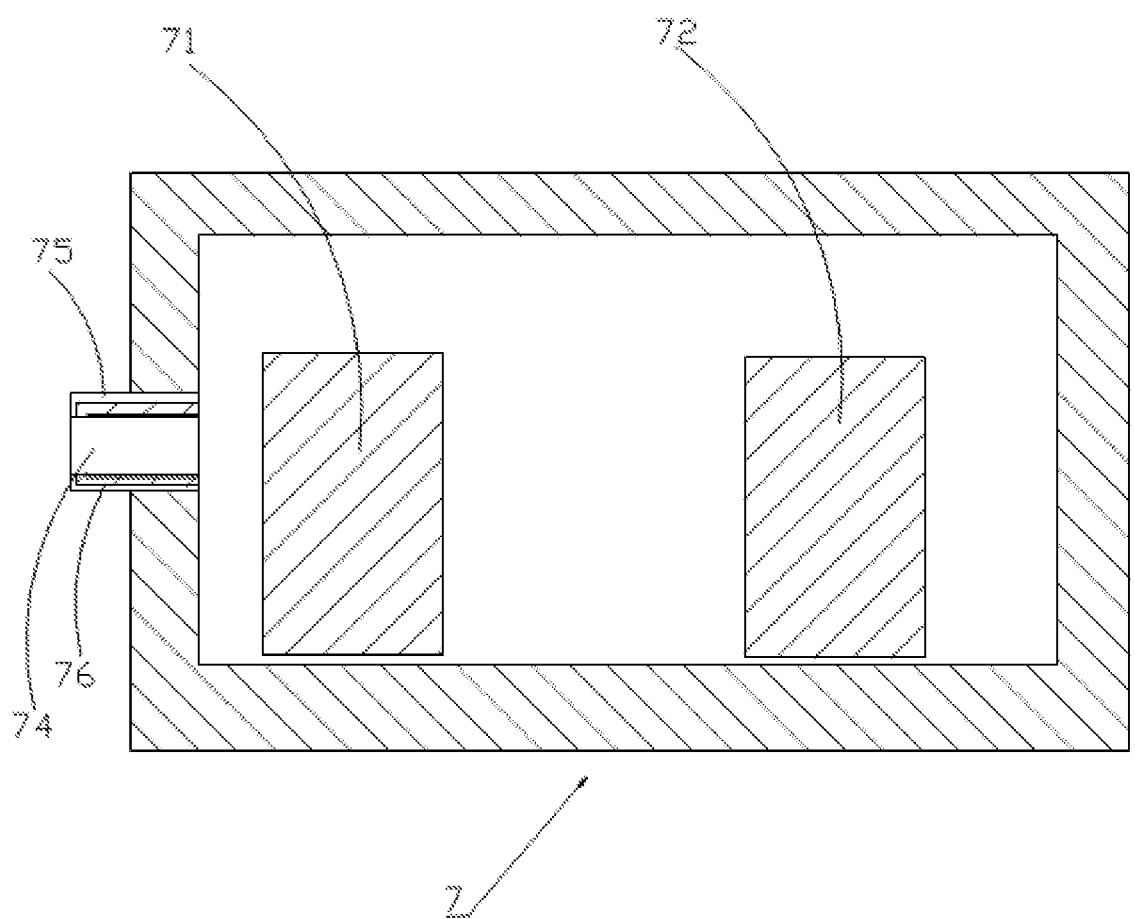
FIG. 21 is a sectional view along a chassis.

Referring to FIG. 1 to FIG. 21, a pet toilet includes:
a drum 1, wherein the drum 1 has a first opening 11 and a first accommodating space 111. The first opening 11 is in communication with the first accommodating space 111, and the
first accommodating space 111 is configured to accommodate pet excrement and pet litter;
a base 2, wherein the base 2 is configured to support the drum 1;
an excrement collection box 3, wherein the excrement collection box 3 is located below the base 2. The excrement collection box 3 has a second accommodating space 311 and a second opening 31, and the second opening 31 is in communication with the second accommodating space 311; and
a sealing door 4, wherein the sealing door 4 is arranged at the second opening 31.

The pet toilet further includes a sieve component 12, wherein the sieve component 12 is connected to the drum 1. The sieve component 12 and an inner wall of the drum 1 are enclosed together to form a third accommodating space 121. The third accommodating space 121 is adjacent to the first accommodating space 111, and the sieve component 12 is configured to separate the pet litter from the excrement;
a drive device 5, wherein the drive device 5 is configured to drive the drum 1 to rotate on the base 2; when the first opening 11 rotates from an initial position to a defecation position along with the drum 1, the pet litter can enter the third accommodating space 121 through the sieve component 12, and the excrement is stopped outside the third accommodating space 121. Furthermore, the sealing door 4 opens the second opening 31, and the first opening 11 rotates along with the drum 1 until it is aligned with the second opening 31, so that the excrement can fall into the second accommodating space 311 through the first opening 11 and the second opening 31 by gravity; when the first opening 11 rotates back from the defecation position to the initial position along with the drum 1, the pet litter in the third accommodating space 121 can pass through the sieve component 12 and fall back into the first accommodating space 111 by its gravity, and the sealing door 4 closes the second opening 31.

Through the above structure, when the drum 1 rotates from the initial position to the defecation position, the pet litter can enter the third accommodating space 121 through the sieve component 12, and the excrement is stopped outside the third accommodating space 121 to separate the pet litter from the excrement. The sealing door 4 opens the second opening 31, and the first opening 11 rotates with the drum 1 until it is aligned with the second opening 31, so that the excrement falls into the second accommodating space 311 by its gravity via the first opening 11 and the second opening 31, thus completing the separation and collection of the excrement; after the excrement has fallen into the second accommodating space 311 of the excrement collection box 3, as the drum 1 rotates from the defecation position back to the initial position, the pet litter in the third accommodating space 121 can pass through the sieve component 12 and fall back into the first accommodating space 111 by its gravity, and the sealing door 4 closes the second opening 31 to enclose the excrement within the excrement collection box 3 and prevent the odor of the excrement from spreading into a living environment.

In this embodiment, when the first opening 11 rotates with the drum 1 from the initial position to the defecation position, the pet litter can enter the third accommodating space 121 through the sieve component 12. The excrement is stopped outside the third accommodating space 121, and the drive device 5 drives the sealing door 4 to open the second opening 31. Furthermore, the first opening 11 rotates with the drum 1 until it is aligned with the second opening 31, so that the excrement can fall into the second accommodating space 311 through its gravity via the first opening 11 and the second opening 31. When the first opening 11 rotates with the drum 1 from the defecation position back to the initial position, the pet litter in the third accommodating space 121 can pass through the sieve component 12 and fall back into the first accommodating space 111 by its gravity, and the drive device 5 drives the sealing door 4 to close the second opening 31. The drive device 5 includes a drive component 51 and a transmission component 52. The first drive device 5 is configured to drive the drum 1 to rotate on the base 2. When the first opening 11 rotates with the drum 1 from the initial position to the defecation position, the drum 1 drives the sealing door 4 to open the second opening 31 through the transmission component 52, and the first opening 11 rotates with the drum 1 until it is aligned with the second opening 31, so that the excrement falls into the second accommodating space 311 by its gravity via the first opening 11 and the second opening 31. When the first opening 11 rotates with the drum 1 from the defecation position back to the initial position, the pet litter in the third accommodating space 121 can pass through the sieve component 12 and fall back into the first accommodating space 111 by its gravity, and the drum 1 drives the sealing door 4 to close the second opening 31 through the transmission component 52. Specifically, the transmission component 52 includes a first transmission member 521 and a second transmission member 522. The first transmission member 521 is arranged on an outer wall of the drum 1, and the second transmission member 522 is located on the sealing door 4. When the first opening 11 rotates with the drum 1 from the initial position to the defecation position, the first transmission member 521 is in transmission connection with the second transmission member 522. The rotation of the drum 1 drives the first transmission member 521 to rotate, and the rotation of the first transmission member 521 drives the second transmission member 522 to move, so that the sealing door 4 moves with the second transmission member 522 to open the second opening 31. The first opening 11 rotates with the drum 1 until it is aligned with the second opening 31, so that the excrement can fall into the second accommodating space 311 by its gravity via the first opening 11 and the second opening 31. When the first opening 11 rotates with the drum 1 from the defecation position back to the initial position, the first transmission member 521 is in transmission connection with the second transmission member 522. The pet litter in the third accommodating space 121 can pass through the sieve component 12 and fall back into the first accommodating space 111 by its gravity, and the rotation of the first transmission member 521 drives the second transmission member 522 to move, so that the sealing door 4 moves with the second transmission member 522 to close the second opening 31. Further, a slide rail 3221 is arranged on the excrement collection box 3. The rotation of the drum 1 drives the first transmission member 521 to rotate, and the rotation of the first transmission member 521 drives the second transmission member 522 to move, so that the sealing door 4 slides with the second transmission member 522 on the slide rail 3221 to open or close the second opening 31. Moreover, the first transmission member 521 is an arc-shaped first rack arranged along an outer circumferential wall of the drum 1; the sealing door 4 is a flat and straight sealing door; the second transmission member 522 is a flat and straight second rack arranged on the sealing door 4; the sliding rail 3221 is a flat and straight slide rail 3221. The rotation of the drum 1 drives the first rack to rotate, so that the first rack drives the second rack to move, and the sealing door 4 slides with the second rack on the slide rail 3221 to open or close the second opening 31. Through the above structure, the arrangement of the drive device 5 is effectively achieved. The drive component 51 drives the drum 1 to rotate on the base 2, and the rotation of the drum 1 drives the first rack to rotate. When the drum 1 rotates from the initial position to the defecation position, the first rack is engaged with the second rack, so that the first rack drives the second rack to move. Thus, the sealing door 4 slides with the second rack on the slide rail 3221 to open the second opening 31, and the sealing door 4 slides with the second transmission member 522 on the slide rail 3221 to open the second opening 31, so that the excrement falls into the second accommodating space 311 of the excrement collection box 3 by its gravity via to the first opening 11 and the second opening 31. When the drum 1 rotates from the defecation position back to the initial position, the first rack is engaged with the second rack, so that the first rack drives the second rack to move. Thus, the sealing door 4 slides with the second rack on the slide rail 3221 to close the second opening 31, and the sealing door 4 slides with the second transmission member 522 on the slide rail 3221 to close the second opening 31, so as to prevent the odor of the excrement from spreading into the living environment.

Figure 22:
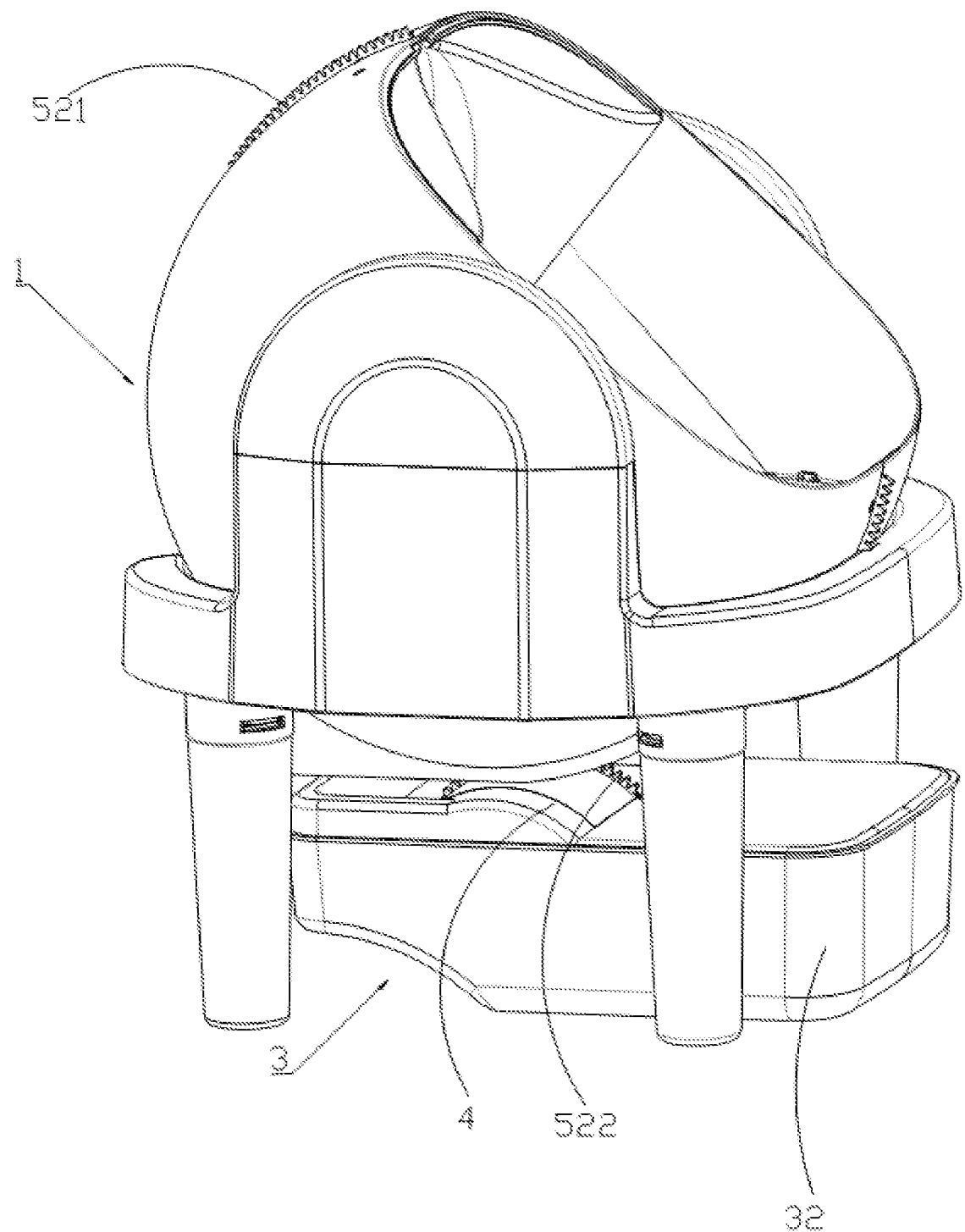
FIG. 22 is a schematic diagram of a structure of an arc-shaped sealing door.
Figure 23:
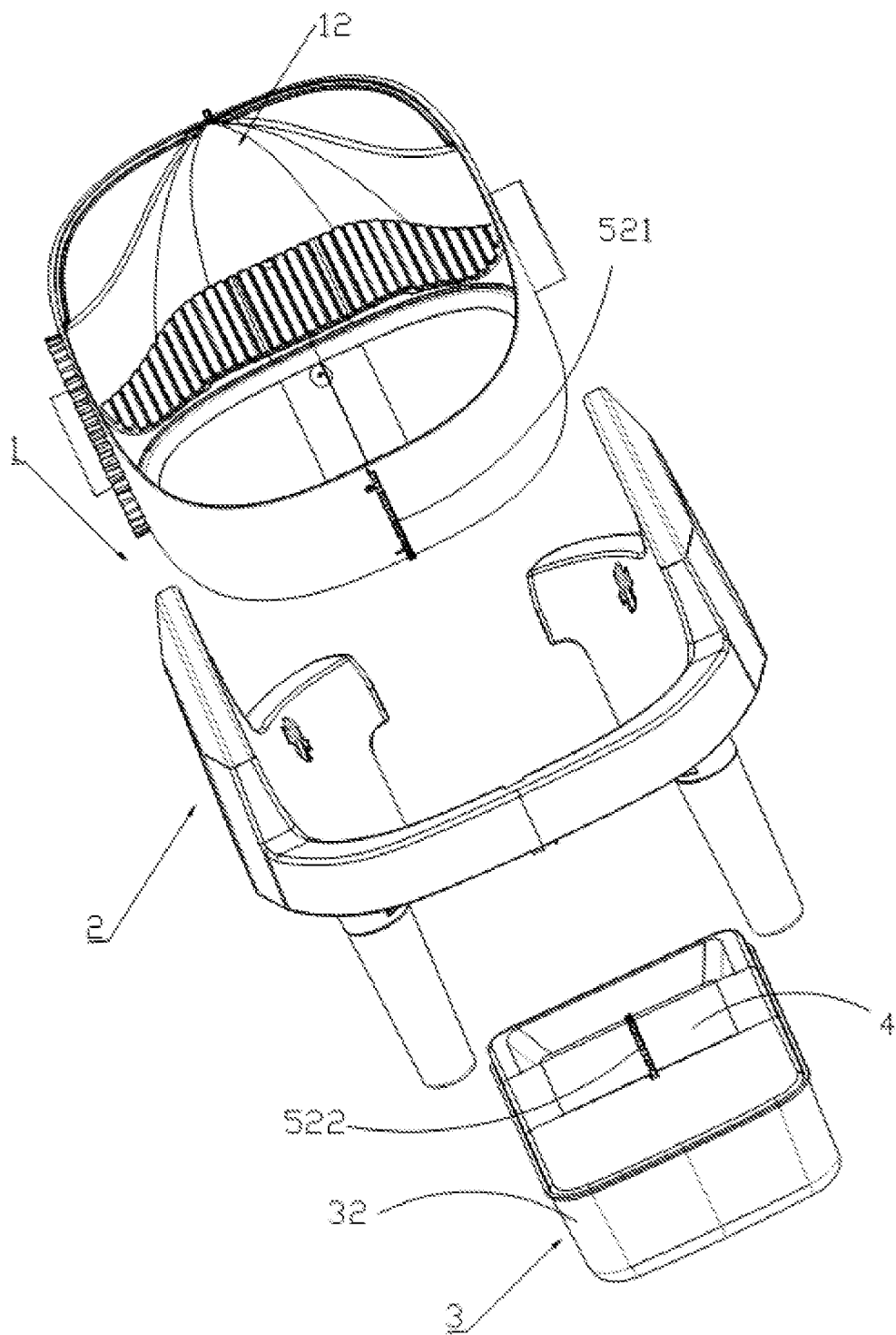
FIG. 23 is an exploded view of a schematic diagram of a structure of an arc-shaped sealing door.
Figure 24:
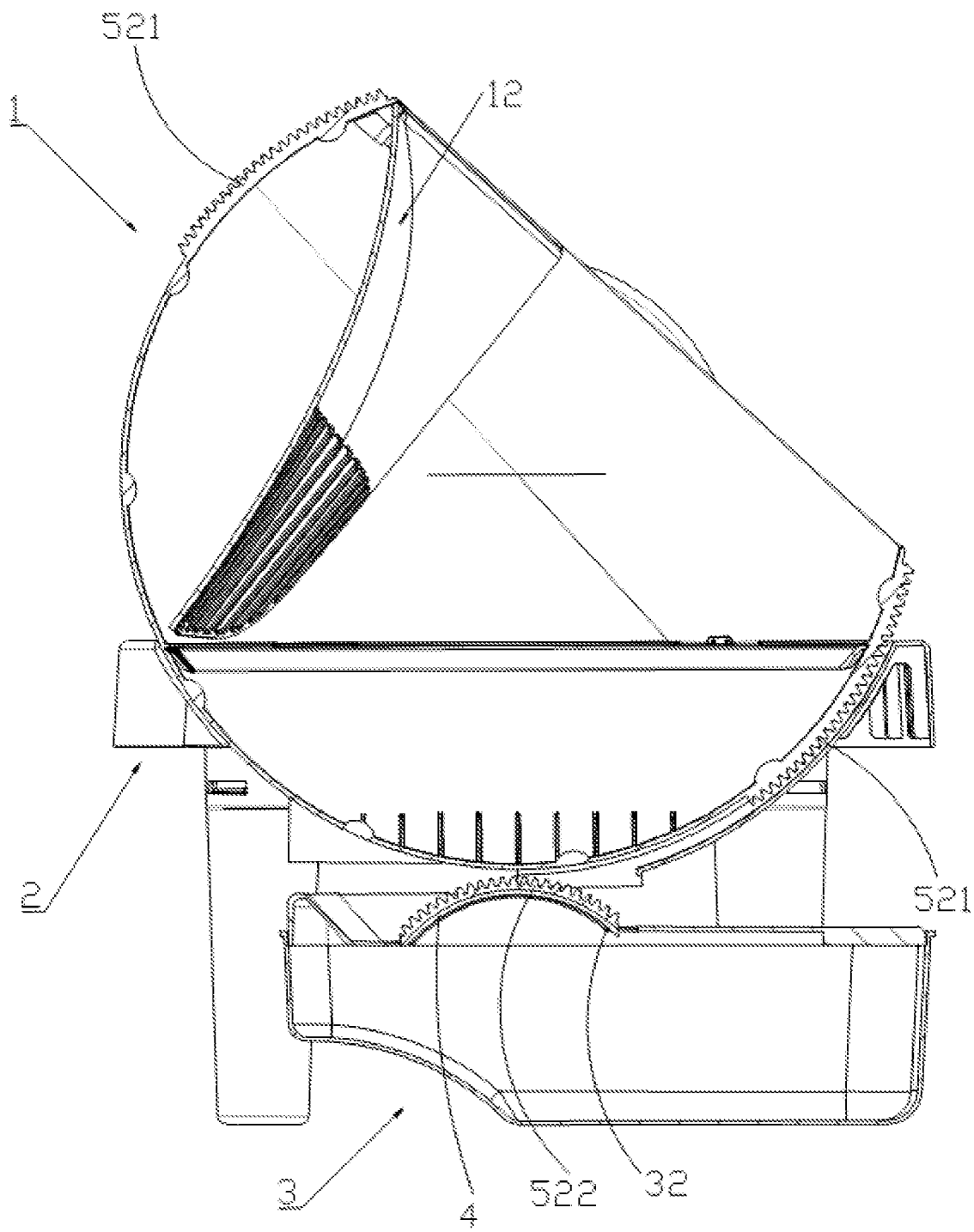
FIG. 24 is a sectional view along an arc-shaped sealing door.

Referring to FIG. 22 to FIG. 24, in some other embodiments, the first transmission member 521 can be an arc-shaped first rack arranged along an outer circumferential wall of the drum 1; the sealing door 4 is an arc-shaped sealing door; the second transmission member 522 is an arc-shaped second rack arranged on the sealing door 4; and the slide rail 3221 is an arc-shaped slide rail. The rotation of the drum 1 drives the first rack to move, and the first rack drives the second rack to move, so that the sealing door 4 slides with the second rack on the slide rail 3221 to open or close the second opening 31.

In this embodiment, the base 2 is also provided with a third opening 21. The third opening 21 is located between the drum 1 and the second opening 31. When the first opening 11 rotates with the drum 1 from the initial position to the defecation position, the pet litter can enter the third accommodating space 121 through the sieve component 12, and the excrement is stopped outside the third accommodating space 121. The sealing door 4 opens the second opening 31, and the first opening 11 rotates with the drum 1 until it is aligned with both the third opening 21 and the second opening 31, so that the excrement can fall into the second accommodating space 311 by its gravity via the first opening 11, the third opening 21, and the second opening 31. When the first opening 11 rotates with the drum 1 from the defecation position back to the initial position, the first opening 11 is misaligned with the second opening 31 and the third opening 21, so that the pet litter in the third accommodating space 121 can pass through the sieve component 12 and fall back into the first accommodating space 111 by its gravity, and the sealing door 4 closes the second opening 31. Through the above structure, the arrangement of the drive device 5 is effectively achieved. The drive component 51 drives the drum 1 to rotate on the base 2, and the rotation of the drum 1 drives the first rack to rotate. When the drum 1 rotates from the initial position to the defecation position, the first rack is engaged with the second rack to enable the first rack to drive the second rack to move. Thus, the sealing door 4 slides with the second transmission member 522 on the slide rail 3221 to open the second opening 31, so that the excrement falls into the second accommodating space 311 of the excrement collection box 3 by its gravity via the first opening 11, the third opening 21, and the second opening 31. When the drum 1 rotates from the defecation position back to the initial position, the first opening 11 rotates until it is misaligned with the second opening 31 and the third opening 21, and the first rack is engaged with the second rack, so that the first rack drives the second rack to move. Thus, the sealing door 4 slides with the second rack on the slide rail 3221 to close the second opening 31, and the sealing door 4 slides with the second transmission member 522 on the slide rail 3221 to close the second opening 31, so as to prevent the odor of the excrement from spreading into the living environment.

In this embodiment, the drive device 51 includes a drive motor 511, a driving gear 512, and a driven gear 513. The drive motor 511 has a drive shaft 514; the driving gear 512 sleeves the drive shaft 514. The driven gear 513 is arranged on the drum 1. The driven gear 513 is engaged with the driving gear 512, so that the rotation of the drive shaft 514 drives the driving gear 512 to rotate; the rotation of the driving gear 512 drives the driven gear 513 to rotate; and the rotation of the driven gear 513 drives the drum 1 to rotate on the base 2. The base 2 is provided with a first support arm 22 on one side, and the base 2 is provided with a second support arm 23 on the other side. Both the first support arm 22 and the second support arm 23 are provided with support grooves 24. The drum 1 is provided with support shafts 13 on two sides. The support shafts 13 are located in the support grooves 24. Several first rollers 241 are arranged inside the support grooves 24, and the first rollers 241 support the support shafts 13. Specifically, the base 2 is further provided with a recess 25 which is sunken in a direction facing away from the drum 1. When the drum 1 is supported to the base 2, a space exists between the drum 1 and an inner wall of the recess 25, and the recess 25 is provided with second rollers 251. Further, the third opening 21 is arranged on the recess 25. Through the above structure, when the driving gear 512 drives the driven gear 513 and the drum 1 to rotate, the support shafts 13 support the first rollers 241, so that the drum 1 rotates on the support arms of the base 2 through the support shafts 13. This effectively improves the transmission efficiency. Moreover, the weight of the drum 1 is concentrated on the support arms on the two sides of the base 2, which can prevent the weight of the drum 1 from being concentrated on the recess 25 and prevent deformation or damage to the base 2 caused by the fact that the drum 1 presses the recess 25. Moreover, due to the space between the drum 1 and the inner wall of the recess 25 and the second rollers 251 on the recess 25, when the weight carried in the drum 1 is relatively large, for example, when the drum 1 stores much pet litter, the outer wall of the drum 1 will deform under the action of the drum. The space between the drum 1 and the inner wall of the recess 25 can further prevent the weight of the drum 1 from being concentrated on the recess 25 and prevent the deformation or damage to the base 2 caused by the fact that the drum 1 presses the recess 25. Furthermore, the second rollers 251 in the recess 25 can assist in the rotation of the drum 1 and make the drum 1 rotate more smoothly on the support arms of the base 1.

In this embodiment, a mounting groove 26 is further arranged below the support groove 24. The mounting groove 26 is in communication with the support groove 24. The driving gear 512 is arranged inside the mounting groove 26, and an inner wall of the mounting groove 26 is provided with a fourth opening 261. The mounting groove 26 is in communication with the outside through the fourth opening 261. Through the above structure, if there is pet litter entering the support groove 24 and the mounting groove 26, the pet litter can be discharged through the fourth opening 261 to the outside. This effectively prevents the pet litter from blocking the support groove 24 and the mounting groove 26, so as to prevent the driving gear 512 and the driven gear 513 from being stuck by the pet litter, thus making the drum 1 rotate more smoothly on the support arms.

In this embodiment, the pet toilet further includes support legs 6. The support legs 6 are connected to the base 2 to support the base 2. Bottom ends of the support legs 6 and the base 2 form a fourth accommodating space 61. The excrement collection box 3 is arranged inside the fourth accommodating space 61. The base 2 includes a left side wall 27, a right side wall 28, and a connecting wall 29 that connects the left side wall 27 to the right side wall 28. The first support arm 22 is arranged on the left side wall 27, and the second support arm 23 is arranged on the right side wall 28. The left side wall 27 has a first end 271 and a second end 272, and the right side wall 28 has a third end 281 and a fourth end 282. A first safety notch 273 is formed between the first end 271 of the left side wall 27 and the third end 281 of the right side wall 28, so as to form an open first safety space 274 between the base 2 and the drum 1. Through the above structure, when the drum 1 rotates on the base 2, if a pet is in the first safety space 274 between the base 2 and the drum 1, the pet can escape through the first safety notch 273. This prevents the pet from being pinched by the base 2 and the rotating drum 1.

In this embodiment, the first support arm 22 is located between the first end 271 and the third end 281, and the second support arm 23 is located between the second end 272 and the fourth end 282.

The second end 272 of the left side wall 27 is connected to the fourth end 282 of the right side wall 28 through the connecting wall 29. Specifically, the excrement collection box 3 includes an accommodating box body 32 and a filling protrusion 33. The filling protrusion 33 is connected to the accommodating box body 32. The filling protrusion 33 is configured to fill a space between the connecting wall 29 and the accommodating box body 32. Through the above structure, the filling protrusion 33 can fill the space between the connecting wall 29 and the accommodating box body 32, to prevent the pet from entering the space, thereby preventing the pet from being pinched by the base 2 and the rotating drum 1. Further, the pet toilet further includes support legs 6. The support legs 6 are connected to the base 2 to support the base 2. Bottom ends of the support legs 6 and the base 2 form the fourth accommodating space 61. The excrement collection box 3 is arranged in the fourth accommodating space 61. The base 2 includes a left side wall 27, a right side wall 28, and a connecting wall 29 that connects the left side wall 27 to the right side wall. The first support arm 22 is arranged on the left side wall 27, and the second support arm 23 is arranged on the right side wall 28. The left side wall 27 has a first end 271 and a second end 272, and the right side wall 28 has a third end 281 and a fourth end 282. A first safety notch 273 exists between the first end 271 of the left side wall 27 and the third end 281 of the right side wall 28, so as to form an open first safety space 274 between the base 2 and the drum 1. The excrement collection box 3 includes an accommodating box body 32 and a filling protrusion 33. The filling protrusion 33 is connected to the accommodating box body 32. The filling protrusion 33 fills the space between the connecting wall 29 and the accommodating box body 32. The excrement collection box 3 is further provided with a first avoidance groove 34. The first avoidance groove 24 extends from the filling protrusion 33. The first avoidance groove 34 is configured to avoid the first rack and the second rack. Through the above structure, the first avoidance groove 34 can avoid the first rack and the second rack, so that the second rack and the sealing door 4 can slide more smoothly on the slide rail 3221, and the first rack can rotate more smoothly with the drum 1, thereby driving the second rack and the sealing door 4 to slide.

Figure 25:
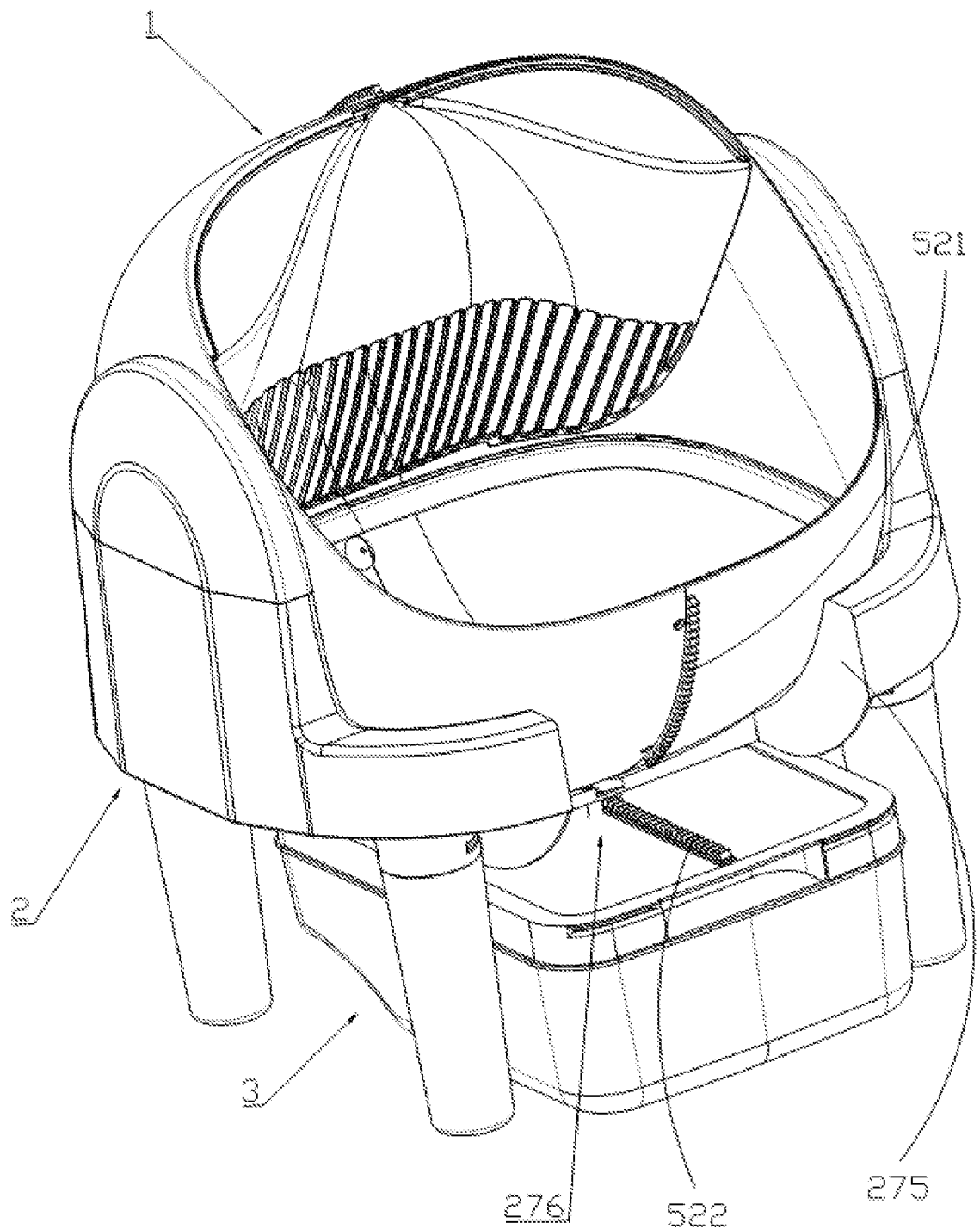
FIG. 25 is a schematic diagram of a structure of a base with a second safety notch.
Figure 26:
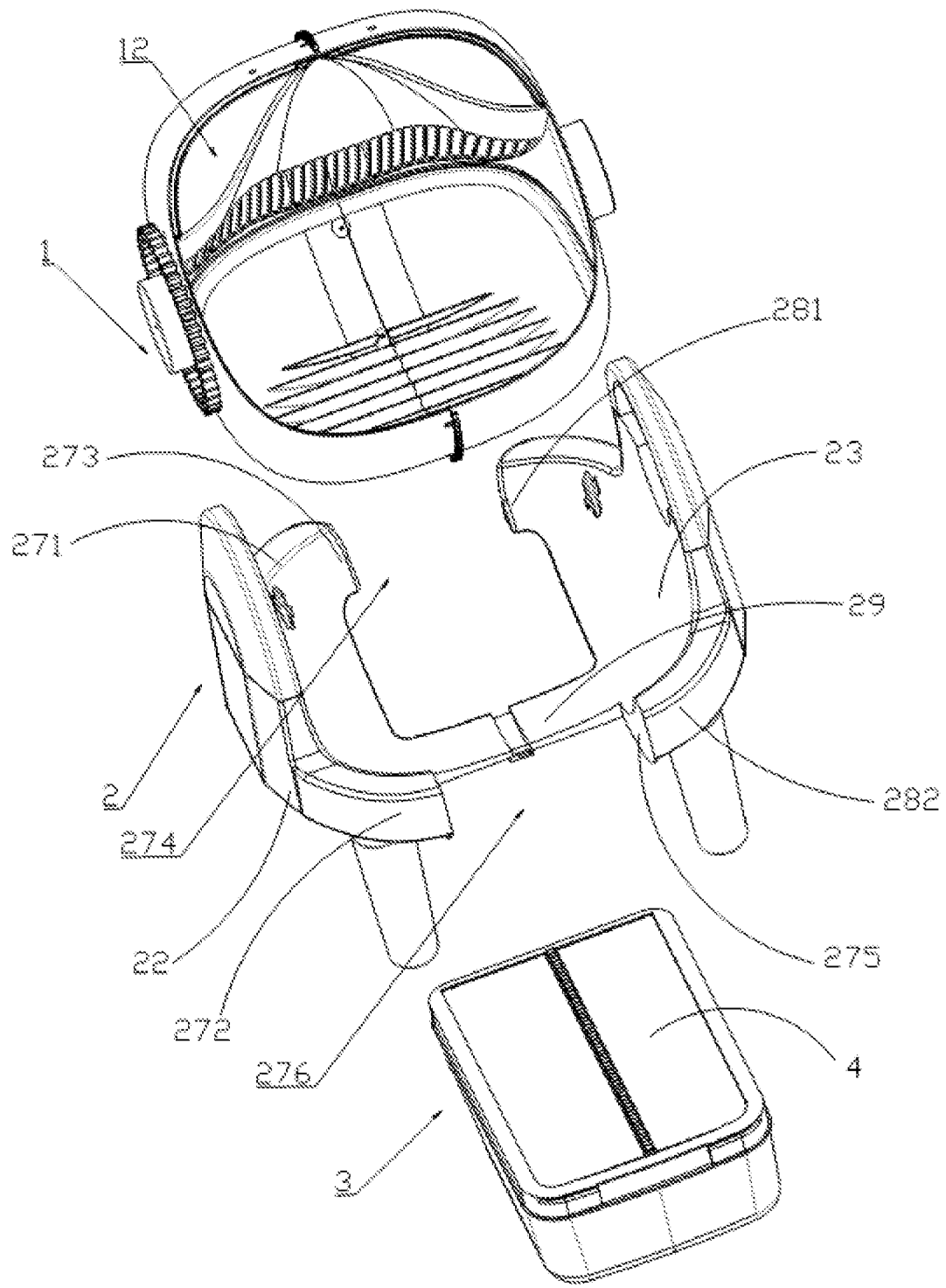
FIG. 26 is an exploded view of a base with a second safety notch.
Figure 27:
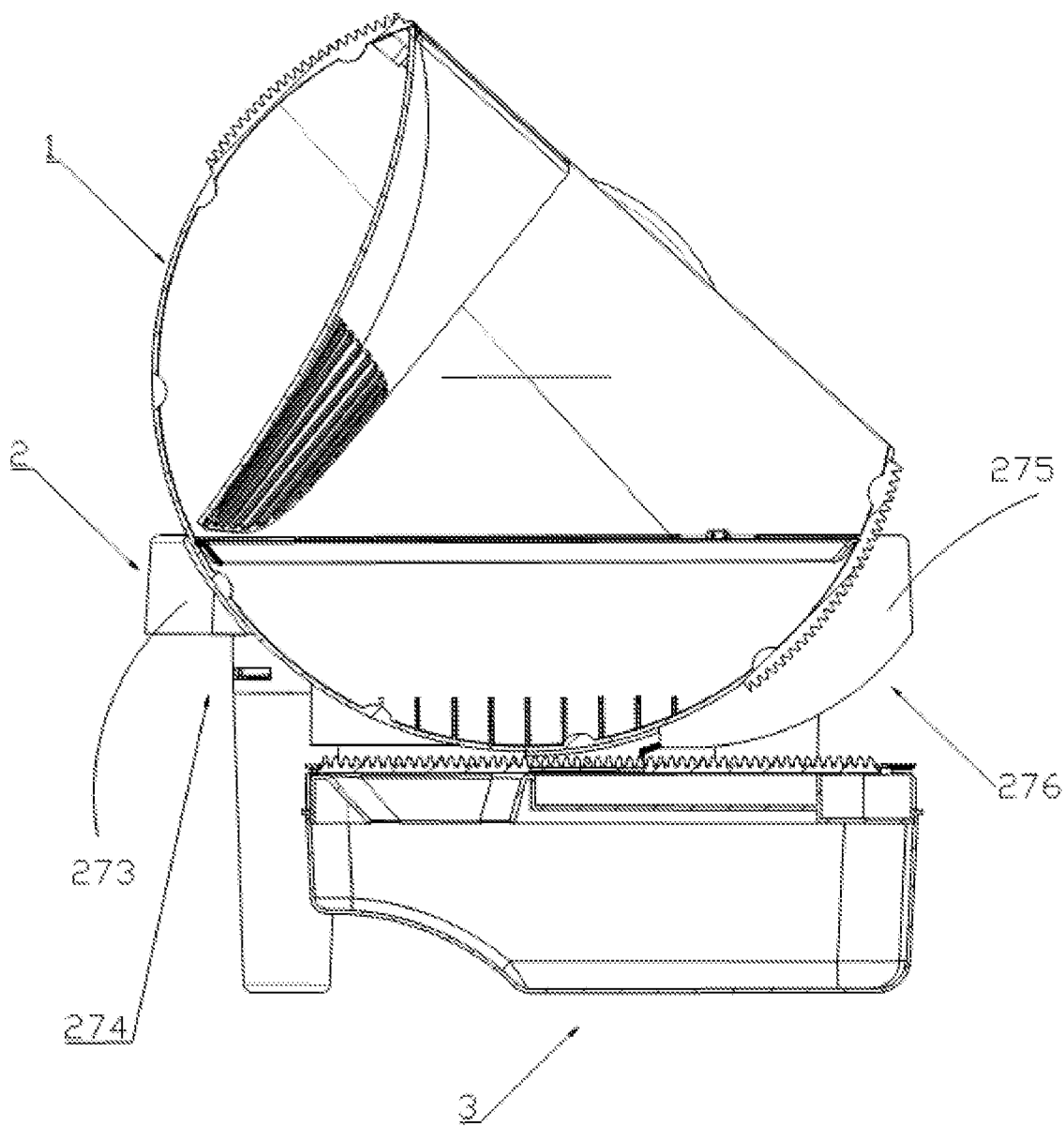
FIG. 27 is a sectional view along a second safety notch.

Referring to FIG. 25 to FIG. 27, in some other embodiment, a middle part of the left side wall 27 and a middle part of the right side wall 28 are connected by the connecting wall 29, so that a second safety notch 275 is formed between the second end 272 of the left side wall 27 and the fourth end 282 of the right side wall 28, to form an open second safety space 276 between the base 2 and the drum 1. When the drum 1 rotates on the base 2, if a pet is located in the second safety space 276 between the base 2 and the drum 1, the pet can escape through the second safety notch 275, which can prevent the pet from being pinched by the base 2 and the rotating drum 1. In addition, the excrement collection box 3 is further provided with a first avoidance groove 34, and the first avoidance groove 34 is configured to avoid the first rack and the second rack.

Figure 28:
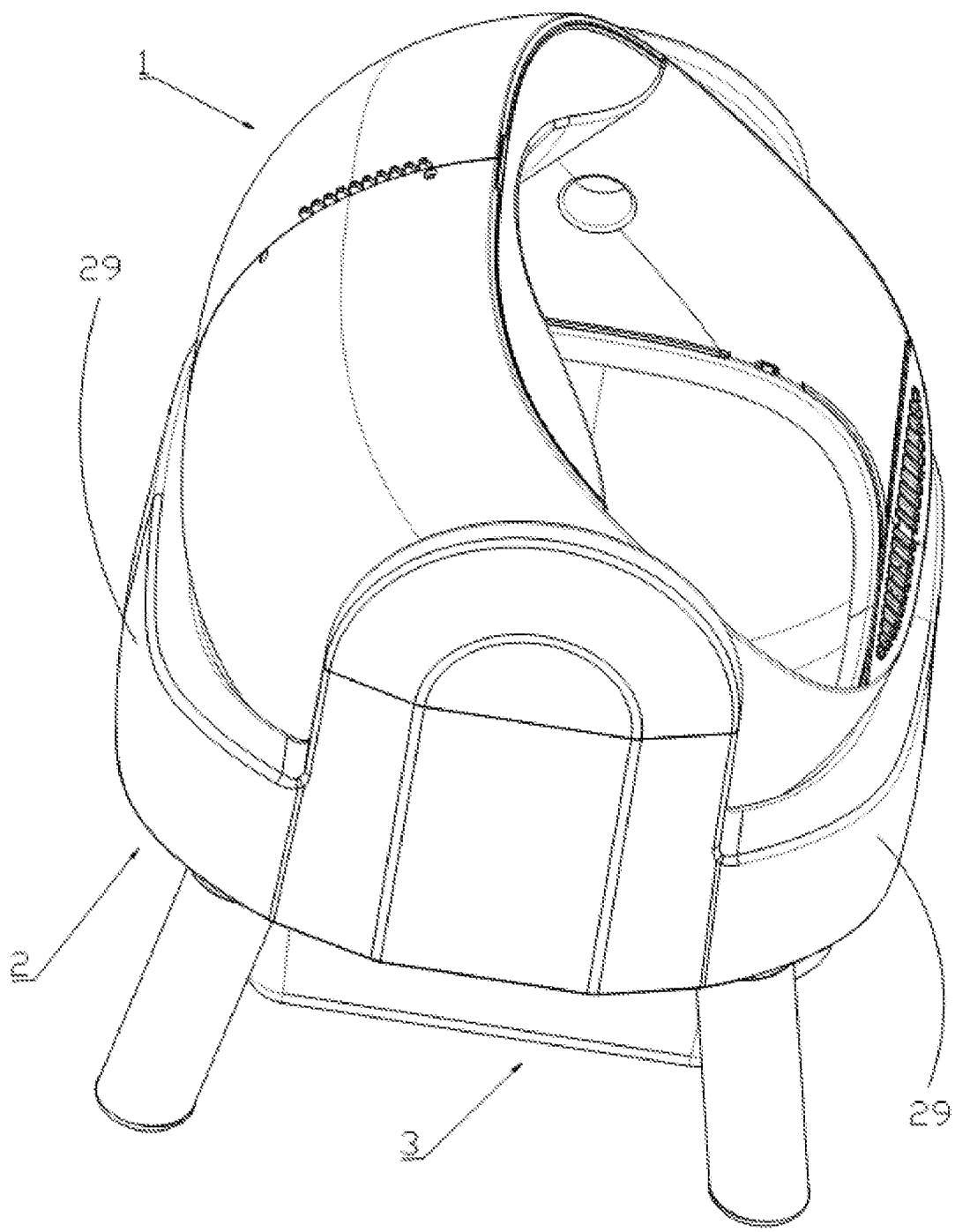
FIG. 28 is a schematic diagram of another overall structure of the present disclosure.
Figure 29:
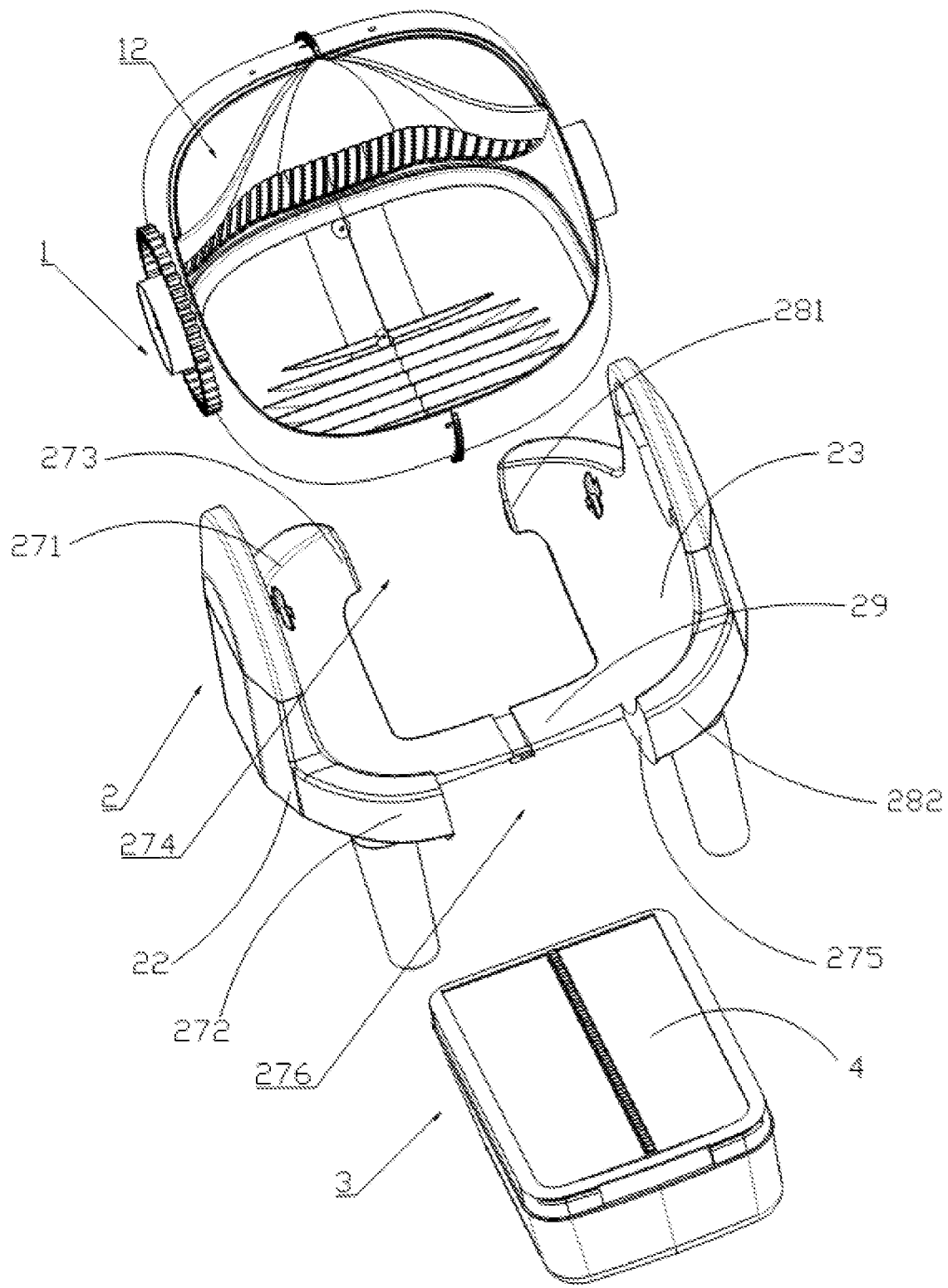
FIG. 29 is another exploded view of the present disclosure.

Referring to FIG. 28 and FIG. 29, in further embodiments, the first end of the left side wall can be connected to the third end of the right side wall, and the second end of the left side wall can be connected to the fourth end of the right side wall, so as to improve the stability of the base.

In this embodiment, the excrement collection box 3 has a first outer side wall 35 and a first bottom wall 36. The first bottom wall 36 is connected to the first outer side wall 35. A distance between one side of the first bottom wall 36 and a bottom end of the first outer side wall 35 is a first distance, and a distance between the other side of the first bottom wall 36 and the bottom end of the first outer side wall 35 is a second distance. The first distance is different from the second distance, so that the first bottom wall 36 is arranged in an inclined angle. The second distance is greater than the first distance. The second opening 31 is arranged above the other side of the first bottom wall 36. Through the above structure, when the excrement is discharged into the second accommodating space 311 of the excrement collection box 3 via the second opening 31, the excrement can slide along an inclined surface from the other side of the first bottom wall 36 to one side of the first bottom wall 36, so as to prevent accumulation of the excrement on the other side of the first bottom wall 36 below the opening.

In this embodiment, a locking device 291 is arranged on the base 2. The locking device 291 is configured to detachably lock the excrement collection box 3 below the base 2. The locking device 291 is a locking snap. Through the above structure, the excrement collection box 3 can be removed by pulling the snap, so that it is convenient for a user to clean the excrement in the excrement collection box 3 and to wash the excrement collection box 3.

In this embodiment, the first accommodating space 111 is internally provided with several raised frameworks 14. The pet toilet further includes a mat 15. The mat 15 is detachably covered at the frameworks 14 and a bottom surface of the first accommodating space 111. Through the above structure, the raised frameworks 14 can support the mat 15, so that the mat 15 is above the bottom surface of the first accommodating space 111. The pet litter can be placed on the mat 15 to reduce a volume of the first accommodating space 111, and it is convenient for the user to adjust the amount of litter used. When a large amount of litter is needed, the mat 15 can be removed, so that the litter is placed directly on the bottom surface of the first accommodating space 111 to increase the volume of the first accommodating space 111.

In this embodiment, the mat 15 is in buckled connection to the inner wall of the drum 1. The mat 15 is provided with a buckle part 151, and the inner wall of the drum 1 is provided with a buckle fitting part 16. The buckle part 151 and the buckle fitting part 16 are detachably connected. Through the above structure, the user can easily mount or remove the mat 15 in or from the first accommodating space 111.

Specifically, the first accommodating space 111 is internally provided with a raised annular leak-proof ring 1111. The annular leak-proof ring 1111 is configured to stop the excrement of the pet in the first accommodating space 111. Through the above structure, when the drum 1 rotates, the annular leak-proof ring 1111 prevents urine and other excreta in the first accommodating space 111 from seeping out of the first accommodating space 111.

In this embodiment, the support legs 6 are detachably connected to the base 2. Specifically, the support legs 6 are in buckled connection to the base 2. Specifically, the base 2 is provided with insertion ports 292. An inner wall of each the insertion port 292 is provided with several bayonets 293.

Outer side walls of the support legs 6 are provided with several buckles 61. When the support legs are inserted into the insertion ports 292, the buckles 61 are connected to the bayonets 293, so that the support legs 6 and the base 2 are combined into a whole. Further, lower sides of the buckles 61 are connected to the outer side walls of the support legs 6. A narrow gap 62 exists between the buckles 61 and the outer side walls of the support legs 6. The narrow gap 62 surrounds upper sides, left sides, and right sides of the buckles 61. Further, each of the insertion port 292 is further provided with a first guide part 294, and each of the support legs 6 is further provided with a second guide part 63. When the support legs are inserted into the insertion ports 292, the first guide parts 294 slide along the second guide parts 63, to connect the buckles 61 with the bayonets 293 and combine the support legs 6 and the base 2 into a whole. Further, the first guide part 294 is a guide block arranged on inner wall of each insertion port 292, and the second guide part 63 is a guide groove arranged on the side wall of each support leg 6. Through the above structure, the support legs 6 can be easily mounted on or removed from the base 2. When the support legs 6 need to support the base 2, during use of the pet toilet, the guide grooves slide along the guide blocks, causing the buckles 61 to slide into the bayonets 293 and be connected to the bayonets 293, so as to mount the support leg 6 to the base 2. When the pet toilet needs to be stored or transported, the buckles 61 can be removed from the bayonets 293, and the support legs 6 can be removed, so as to reduce a volume of the pet toilet, to facilitate transportation and storage of the litter box.

In this embodiment, the pet toilet further includes a chassis 7, a control motherboard 71, and a power module 72. The control motherboard 71 is electrically connected to the power module 72. The chassis 7 is provided with a fifth accommodating space 73. The fifth accommodating space 73 is formed by a side wall of the chassis 7. Both the control motherboard 71 and the power module 72 are arranged inside the chassis 7. The pet toilet further includes an interface group 74. The interface group 74 includes several interfaces. The chassis 7 is provided with several first mounting openings 75. The interface group 74 is electrically connected to the control motherboard 71 and the power module 72, and the interface group 74 is arranged inside the first mounting opening 75. A sealing member 76 is arranged between the interface group 74 and an inner wall of the first mounting opening 75. Specifically, the pet toilet further includes an infrared detection device 77. The infrared detection device 77 is connected to the drum 1 or the base 2. The infrared detection device 77 is configured to detect whether a pet enters the drum 1. Further, the pet toilet further includes a Hall sensor device 78. The Hall sensor device 78 is configured to detect a position of rotation of drum 1. Further, the Hall sensor device 78 includes a magnetic induction region 781, a first magnetic pole 782, and a second magnetic pole 783. The magnetic induction region 781 is arranged on the first support arm 22 or the second support arm 23, and the first magnetic pole 782 and the second magnetic pole 783 are arranged on the drum 1. When the drum 1 rotates to the initial position, the first magnetic pole 782 is located at the magnetic induction region 781; when the drum 1 rotates to the defecation position, the second magnetic pole 783 is located at the magnetic induction region 781. Further, the interface group 74 includes at least an infrared detection device interface 741, a Hall sensor device interface 742, and a power supply interface 743. The infrared detection device interface 741 is configured to be electrically connected to the infrared detection device; the Hall sensor device interface 742 is configured to be electrically connected to the Hall sensor device; the power supply interface 743 is configured to supply power to the drive device 5. Through the above structure, the infrared detection device 77 can detect whether a pet enters the drum 1. When it is detected that a pet has entered the drum 1 for defecation and leaves the drum 1, the control motherboard 71 can control, according to a signal fed back by the infrared detection device 77, the drum 1 to rotate from the initial position to the defecation position. When the magnetic induction region 781 senses the second magnetic pole 783, the drum 1 rotates to the defecation position. The control motherboard 71 then controls, according to a signal fed back by the Hall sensor device 78, the drum 1 to stop the rotation, so that the excrement is discharged into the excrement collection box 3. After the excrement is discharged into the excrement collection box 3, the control motherboard 71 controls the drum 1 to rotate back from the defecation position to the initial position. When the magnetic induction region 781 senses the first magnetic pole 782, the drum 1 rotates back to the initial position. The control motherboard 71 then controls, according to a signal fed back by the Hall sensor device 78, the drum 1 to stop the rotation, so that the drum 1 is maintained at the initial position for pets to enter for defecation and leave. Further, since the power supply and the control motherboard 71 are located inside the chassis 7, and the chassis 7 is provided with an infrared detection device interface group 74, a Hall sensor device interface group 78 and a power supply interface 743, a modular design is achieved. This facilitates the mounting of a power supply, the control motherboard 71, the infrared detection device 77, the Hall sensor device 78, and the drive device 5. Furthermore, the sealing member 76 is arranged between the interface group 74 and the inner wall of the first mounting opening 75, which prevents liquid from seeping into the chassis 7. This not only prevents the power supply and control motherboard 71 inside the chassis 7 from being corroded by liquid, but also prevents short-circuiting of the power supply and control motherboard 71 caused by liquid seeping into the chassis 7, thereby further prolonging the lifespan of the pet toilet.

In this embodiment, a middle part of the sieve component 12 is indented towards the inner wall of the drum 1 to form a flow guide channel 1211. Through the above structure, it is convenient to discharge the excrement along the flow guide channel 1211 into the excrement collection box via the first opening 11 and the second opening 31.

The sieve component 12 includes a first part 122 and a second part 123. The first part 122 is connected to the drum 1, and the second part 123 is connected to the first part 122. Moreover, the second part 123 is located between the first accommodating space 111 and the first part 122. The second part 123 is provided with several sieve holes 1231. Specifically, a depth of the flow guide channel 1211 increases gradually from the second part 123 to the first part 122, and a width of the flow guide channel 1211 gradually decreases from the second part 123 to the first part 122. Further, the first part 122 includes a first baffle plate 1221 and a second baffle plate 1222. One side of the first baffle plate 1221 is connected to the second part 123, and a middle part of the other side of the first baffle plate 1221 is connected to a middle part of the drum 1. Two ends of the other side of the first baffle plate 1221 are connected to two ends of the drum 1 through the second baffle plate 1222. The second baffle plate 1222 is arranged at an acute, right, or obtuse angle relative to the first baffle plate 1221. Meanwhile, the second baffle plate 1222 also plays a role in blocking the pet litter, so as to prevent the pet litter from being scattered into an external environment when the drum 1 rotates.

As described above, one or more embodiments are provided in conjunction with the detailed description, The specific implementation of the present disclosure is not confirmed to be limited to that the description is similar to or similar to the method, the structure and the like of the present disclosure, or a plurality of technical deductions or substitutions are made on the premise of the conception of the present disclosure to be regarded as the protection of the present disclosure.

What is claimed is:

1. A pet toilet, comprising:
   a drum, wherein the drum is provided with a first opening and a first accommodating space; the first opening is in communication with the first accommodating space, and the first accommodating space is configured to accommodate excrement of a pet and pet litter;
   a base, wherein the base is configured to support the drum; the base includes a left side wall, a right side wall, and a connecting wall that connects the left side wall to the right side wall; a first support arm is arranged on the left side wall, and a second support arm is arranged on the right side wall; the left side wall has a first end and a second end, and the right side wall has a third end and a fourth end; a first safety notch is formed between the first end of the left side wall and the third end of the right side wall, so as to form an open first safety space between the base and the drum;
   an excrement collection box, wherein the excrement collection box is arranged below the base, and the excrement collection box has a second accommodating space and a second opening; the second opening is in communication with the second accommodating space;
   a sieve component, wherein the sieve component is connected to the drum; the sieve component and an inner wall of the drum are enclosed to form a third accommodating space; the third accommodating space is adjacent to the first accommodating space; the sieve component is configured to separate the pet litter from the excrement; and
   a drive device, wherein the drive device is configured to drive the drum to rotate on the base; when the first opening rotates with the drum from an initial position to a defecation position, the pet litter enters the third accommodating space through the sieve component, and the excrement is stopped outside the third accommodating space; the first opening is aligned with the second opening as the drum rotates, so that the excrement falls into the second accommodating space by an own gravity via the first opening and the second opening; and when the first opening rotates with the drum from the defecation position to the initial position, the pet litter in the third accommodating space passes through the sieve component and falls back into the first accommodating space by the own gravity.

2. The pet toilet according to claim 1, wherein the second end of the left side wall is connected to the fourth end of the right side wall through the connecting wall.

3. The pet toilet according to claim 2, wherein the excrement collection box includes an accommodating box body and a filling protrusion; the filling protrusion is connected to the accommodating box body and is configured to fill a space between the connecting wall and the accommodating box body.

4. The pet toilet according to claim 1, wherein a second safety notch is formed between the second end of the left side wall and the fourth end of the right side wall, so as to form an open second safety space between the base and the drum.

5. The pet toilet according to claim 4, wherein a middle part of the left side wall is connected to a middle part of the right side wall through the connecting wall.

6. The pet toilet according to claim 1, wherein the drive device includes a drive component; the drive component includes a drive motor, a driving gear, and a driven gear; the drive motor has a drive shaft; the driving gear sleeves the drive shaft; the driven gear is arranged on the drum; the driven gear is engaged with the driving gear, so that the rotation of the drive shaft drives the driving gear to rotate, and the rotation of the driving gear drives the driven gear to rotate; and the rotation of the driven gear drives the drum to rotate on the base.

7. The pet toilet according to claim 6, wherein one side of the base is provided with a first support arm, and the other side of the base is provided with a second support arm; the first support arm and the second support arm are provided with support grooves; each of two sides of the drum has a support shaft; the support shafts are located in the support grooves; several first rollers are arranged in the support grooves; and the first rollers support the support shafts.

8. The pet toilet according to claim 7, wherein a mounting groove is also arranged below the support grooves; the mounting groove is in communication with the support grooves; the driving gear is arranged inside the mounting groove; a fourth opening is arranged on an inner wall of the mounting groove; and the mounting groove is in communication with the outside through the fourth opening.

9. The pet toilet according to claim 7, wherein the first support arm is located between the first end and the third end, and the second support arm is located between the second end and the fourth end.

10. The pet toilet according to claim 1, wherein the base is further provided with a recess that is indented in a direction facing away from the drum; when the drum is supported on the base, a space exists between the drum and an inner wall of the recess; and the recess is provided with second rollers.

11. The pet toilet according to claim 1, wherein the excrement collection box has a first outer side wall and a first bottom wall; the first bottom wall is connected to the first outer side wall; a distance between one side of the first bottom wall and a bottom end of the first outer side wall is a first distance; a distance between the other side of the first bottom wall and the bottom end of the first outer side wall is a second distance; and the first distance is different from the second distance, so that the first bottom wall is arranged in an inclined angle.

12. The pet toilet according to claim 1, wherein a locking device is arranged on the base; the locking device is configured to detachably lock the excrement collection box below the base.

13. The pet toilet according to claim 12, wherein the locking device is a locking snap.

14. The pet toilet according to claim 1, wherein several raised frameworks are arranged within the first accommodating space.

15. The pet toilet according to claim 14, further comprising a mat; and the mat is detachably covered at the frameworks and a bottom surface of the first accommodating space.

16. The pet toilet according to claim 15, wherein the mat is in buckled connection to the inner wall of the drum.

17. The pet toilet according to claim 16, wherein the mat is provided with a buckle part, and the inner wall of the drum is provided with a buckle fitting part, so that the buckle part and the buckle fitting part are detachably connected.

18. The pet toilet according to claim 1, wherein a raised annular leak-proof ring is arranged in the first accommodating space; and the annular leak-proof ring is configured to stop the excrement of the pet in the first accommodating space.

19. The pet toilet according to claim 14, further comprising support legs, wherein the support legs are connected to the base to support the base, and a fourth accommodating space is formed between bottom ends of the support legs and the base and the excrement collection box is arranged inside the fourth accommodating space.

20. The pet toilet according to claim 19, wherein the support legs are detachably connected to the base.

\* \* \* \* \*